United States Patent
Okada et al.

(10) Patent No.: US 10,062,926 B2
(45) Date of Patent: Aug. 28, 2018

(54) ELECTROLYTE SOLUTION, ELECTROCHEMICAL DEVICE, LITHIUM ION SECONDARY BATTERY, AND MODULE

(71) Applicant: Daikin Industries, Ltd., Osaka-shi, Osaka (JP)

(72) Inventors: Michiaki Okada, Osaka (JP); Akinori Tani, Osaka (JP); Shinichi Kinoshita, Osaka (JP); Tomo Shimada, Osaka (JP); Hiroyuki Arima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 202 days.

(21) Appl. No.: 15/124,768

(22) PCT Filed: Mar. 24, 2015

(86) PCT No.: PCT/JP2015/058964
§ 371 (c)(1),
(2) Date: Sep. 9, 2016

(87) PCT Pub. No.: WO2015/147003
PCT Pub. Date: Oct. 1, 2015

(65) Prior Publication Data
US 2017/0222277 A1    Aug. 3, 2017

(30) Foreign Application Priority Data

Mar. 27, 2014  (JP) .................. 2014-067015

(51) Int. Cl.
*H01M 10/0567* (2010.01)
*H01M 10/0568* (2010.01)
(Continued)

(52) U.S. Cl.
CPC ........ *H01M 10/4235* (2013.01); *H01G 11/60* (2013.01); *H01G 11/64* (2013.01);
(Continued)

(58) Field of Classification Search
None
See application file for complete search history.

(56) References Cited

U.S. PATENT DOCUMENTS

| | | | |
|---|---|---|---|
| 6,444,360 | B2 | 9/2002 | Gan et al. |
| 7,824,578 | B2 | 11/2010 | Lee et al. |
| 2001/0006751 | A1 | 7/2001 | Gan et al. |

FOREIGN PATENT DOCUMENTS

| | | |
|---|---|---|
| CN | 101263628 A | 9/2008 |
| JP | 7-176322 A | 7/1995 |

(Continued)

OTHER PUBLICATIONS

International Preliminary Report on Patentability dated Sep. 27, 2016, issued by the International Bureau in corresponding International Application No. PCT/JP2015/058964.
(Continued)

*Primary Examiner* — Yoshitoshi Takeuchi
(74) *Attorney, Agent, or Firm* — Sughrue Mion, PLLC

(57) ABSTRACT

The present invention provides an electrolytic solution capable of restraining gas generation. The present invention relates to an electrolytic solution containing a nonaqueous solvent (I), an electrolyte salt (II), and a compound (III) represented by the following formula (1):

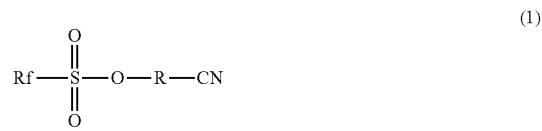

(1)

wherein Rf represents a C1-C20 linear or branched fluorinated alkyl group or a C3-C20 fluorinated alkyl group having a cyclic structure, R represents a C1-C20 linear or
(Continued)

branched alkylene group or a C3-C20 alkylene group having a cyclic structure, hydrogen atoms in R may be partially or fully replaced by fluorine atoms, Rf and R may each contain an oxygen atom between carbon atoms when having a carbon number of 2 or more as long as oxygen atoms are not adjacent to each other.

12 Claims, 1 Drawing Sheet

(51) Int. Cl.
  *H01G 11/64* (2013.01)
  *H01M 10/42* (2006.01)
  *H01G 11/60* (2013.01)
  *H01M 10/0525* (2010.01)
  *H01M 10/0569* (2010.01)

(52) U.S. Cl.
  CPC ... *H01M 10/0525* (2013.01); *H01M 10/0567* (2013.01); *H01M 10/0568* (2013.01); *H01M 10/0569* (2013.01); *H01M 2220/30* (2013.01); *H01M 2300/004* (2013.01); *H01M 2300/0034* (2013.01)

(56) References Cited

FOREIGN PATENT DOCUMENTS

| | | |
|---|---|---|
| JP | 2002-302649 A | 10/2002 |
| JP | 2003-7336 A | 1/2003 |
| JP | 2005-259641 A | 9/2005 |
| WO | 2005/069423 A1 | 7/2005 |
| WO | 2007/061180 A1 | 5/2007 |

OTHER PUBLICATIONS

International Search Report for PCT/JP2015/058964 dated May 26, 2015.

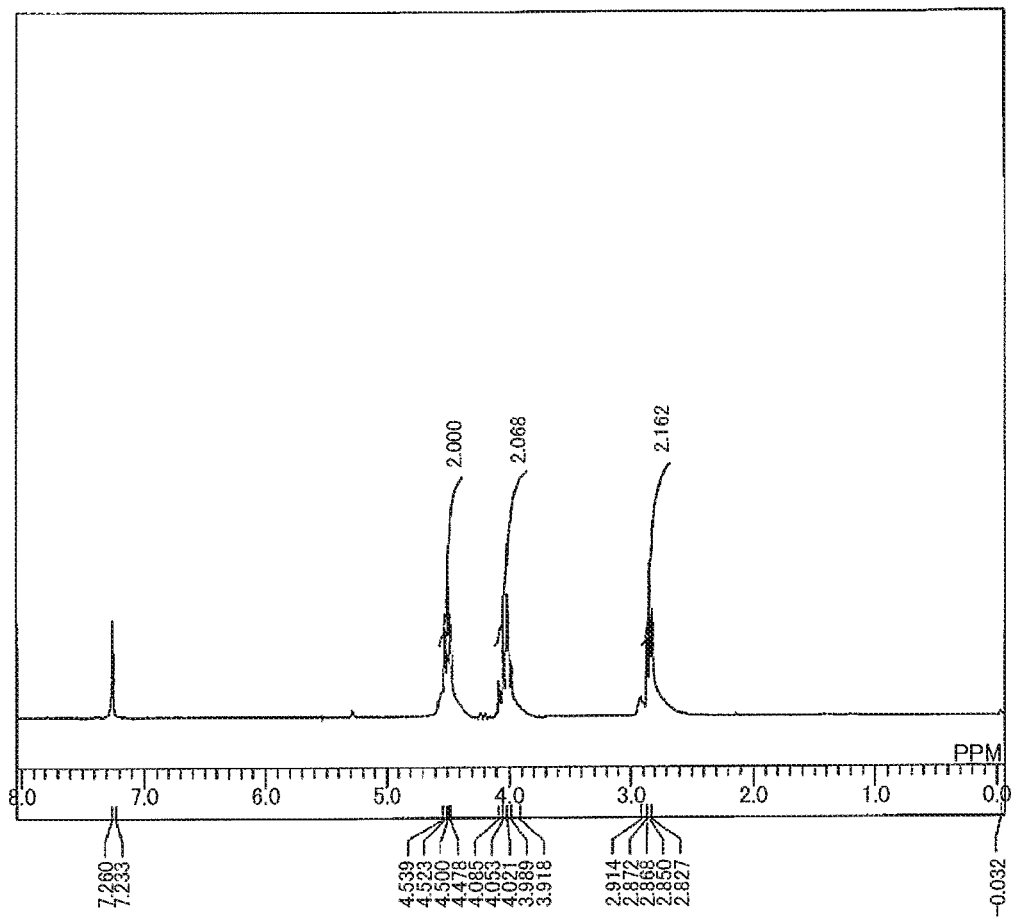

ELECTROLYTE SOLUTION, ELECTROCHEMICAL DEVICE, LITHIUM ION SECONDARY BATTERY, AND MODULE

CROSS REFERENCE TO RELATED APPLICATIONS

This application is a National Stage of International Application No. PCT/JP2015/058964 filed Mar. 24, 2015, claiming priority based on Japanese Patent Application No. 2014-067015 filed Mar. 27, 2014, the contents of all of which are incorporated herein by reference in their entirety.

TECHNICAL FIELD

The present invention relates to electrolytic solutions, electrochemical devices, lithium ion secondary batteries, and modules.

BACKGROUND ART

Rapid improvement of portable electronic devices, such as cellphones and laptops, leads to requirements for higher capacity of batteries used for main powder supplies and uninterruptible power supplies of such portable devices. Then, electrochemical devices which are nonaqueous electrolytic batteries, such as lithium ion secondary batteries, have attracted attention because these batteries have a higher energy density than nickel-cadmium batteries and nickel-hydrogen batteries.

Typical examples of the electrolytic solution for lithium ion secondary batteries include nonaqueous electrolytic solutions prepared by dissolving an electrolyte (e.g., $LiPF_6$, $LiBF_4$, $LiN(CF_3SO_2)_2$, $LiCF_3(CF_2)_3SO_3$) in a solvent mixture of a high permittivity solvent (e.g., ethylene carbonate, propylene carbonate) and a low viscosity solvent (e.g., dimethyl carbonate, diethyl carbonate, ethyl methyl carbonate).

Negative electrode active materials of lithium ion secondary batteries mainly comprise a carbonaceous material which can occlude and release lithium ions. Typical examples thereof include natural graphite, artificial graphite, and amorphous carbon. Further, metal- or alloy-based negative electrodes comprising elements such as silicon and tin are also known to provide a much higher capacity. Positive electrode active materials of the above batteries mainly comprise a transition metal complex oxide which can occlude and release lithium ions. Typical examples of the transition metal include cobalt, nickel, manganese, and iron.

Such lithium ion secondary batteries comprise highly active positive and negative electrodes. These electrodes disadvantageously cause side reactions with the electrolytic solution, and such side reactions are known to decrease the charge and discharge capacities. In order to improve the above battery characteristics, researchers have performed various studies on nonaqueous solvents and electrolytes.

Patent Literature 1 proposes to use an electrolytic solution comprising an organic compound having two or more nitrile groups. The nitrile groups are polarized to give a large dipole moment, and this large dipole moment restrains oxidative decomposition of the electrolytic solution on the positive electrode during charging at high voltage, thereby improving the battery characteristics.

Patent Literature 2 discloses an agent for forming a film on electrode surfaces, the agent comprising a specific nitrile compound, and thus improving the thermal stability of batteries.

Patent Literature 3 discloses a nonaqueous electrolyte secondary battery which comprises a fluorinated nitrile compound in an electrolytic solution, and thus has excellent charge and discharge efficiency and storage characteristics.

Patent Literature 4 discloses that addition of a compound having an isocyanate group to a nonaqueous electrolytic solution restrains a decomposing reaction of a solvent on the negative electrode, and thus improves the cycle characteristics of batteries.

Patent Literature 5 proposes to form a complex of an aliphatic nitrile compound with the surface of a positive electrode active material and thereby form a protective film on the positive electrode. This improves the safety of batteries against overcharge and/or physical impact from the outside.

Patent Literature 6 proposes addition of a sulfate as an additive to a nonaqueous electrolytic solution with an aim of improving the pulse discharge characteristics of an alkali metal electrochemical cell, in particular a primary lithium electrochemical cell.

Patent Literature 7 proposes use of a sulfonate-based compound containing at least one substituent selected from the group consisting of a cyano group, an isocyanate group, a thiocyanate group, and an isothiocyanate group with an aim of improving the high-temperature lifespan characteristics of lithium batteries.

Patent Literature 8 proposes use of a sulfate compound having a $C(sp)-C(sp^3)$ unsaturated hydrocarbon bond with an aim of improving the high temperature cycle characteristics of lithium batteries.

CITATION LIST

Patent Literature

Patent Literature 1: JP H07-176322 A
Patent Literature 2: JP 2002-302649 A
Patent Literature 3: JP 2003-7336 A
Patent Literature 4: JP 2005-259641 A
Patent Literature 5: WO 2005/069423
Patent Literature 6: US 2001/0006751 A
Patent Literature 7: U.S. Pat. No. 7,824,578 B
Patent Literature 8: U.S. Pat. No. 6,444,360 B

SUMMARY OF INVENTION

Technical Problem

Requirements for higher capacity of batteries have further increased in recent years. Especially, in order to achieve better high-temperature storage characteristics, gas generation, which has not been conventionally restrained sufficiently, is required to be restrained.

The present invention is devised to solve the above problems, and aims to provide an electrolytic solution capable of restraining gas generation in electrochemical devices which are nonaqueous electrolytic batteries, and an electrochemical device, a lithium ion secondary battery, and a module each comprising this electrolytic solution.

Solution to Problem

The present inventors found that an electrolytic solution containing a fluorinated cyclic carbonate or a fluorinated acyclic carbonate is especially likely to generate gas, that a specific fluorine compound containing a nitrile group surprisingly restrain gas generation, and that, even in the case of using a nonfluorinated cyclic carbonate or a nonfluorinated acyclic carbonate which is less likely to generate gas, a specific fluorine compound containing a nitrile group can further restrain gas regeneration, thereby completing the present invention.

Specifically, the present invention relates to an electrolytic solution including a nonaqueous solvent (I), an electrolyte salt (II), and a compound (III) represented by the following formula (1):

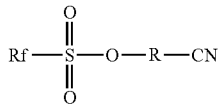
(1)

wherein Rf represents a C1-C20 linear or branched fluorinated alkyl group or a C3-C20 fluorinated alkyl group having a cyclic structure, R represents a C1-C20 linear or branched alkylene group or a C3-C20 alkylene group having a cyclic structure, hydrogen atoms in R may be partially or fully replaced by fluorine atoms, Rf and R may each contain an oxygen atom between carbon atoms when having a carbon number of 2 or more as long as oxygen atoms are not adjacent to each other.

Rf is preferably CF$_3$— or CF$_3$—CH$_2$—.

R is preferably —CH$_2$—, —CH$_2$—CH$_2$—, or —CH$_2$—CH$_2$—CH$_2$—.

The nonaqueous solvent (I) contains preferably a fluorinated cyclic carbonate or a nonfluorinated cyclic carbonate, more preferably a fluorinated cyclic carbonate.

The nonaqueous solvent (I) contains preferably a fluorinated acyclic carbonate or a nonfluorinated acyclic carbonate, more preferably a fluorinated acyclic carbonate.

The fluorinated cyclic carbonate is preferably at least one compound selected from the group consisting of compounds represented by the following formulas (2) to (7):

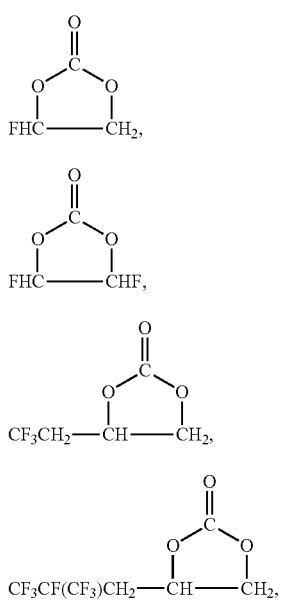

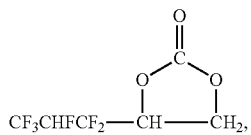
(6)

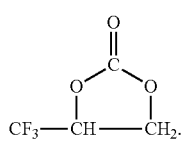
(7)

The fluorinated acyclic carbonate is preferably at least one compound selected from the group consisting of (2,2,2-trifluoroethyl)methyl carbonate and (2,2,3,3-tetrafluoropropyl)methyl carbonate.

The present invention also encompasses an electrochemical device comprising the electrolytic solution.

The present invention also encompasses a lithium ion secondary battery comprising the electrolytic solution.

The present invention also encompasses a module comprising the lithium ion secondary battery.

Advantageous Effects of Invention

The present invention can provide an electrolytic solution, an electrochemical device, a lithium ion secondary battery, and a module which can restrain gas generation.

BRIEF DESCRIPTION OF DRAWINGS

FIG. 1 shows an exemplary result of $^1$H-NMR analysis upon synthesis of a compound represented by the formula (15) by a method mentioned in the present description.

DESCRIPTION OF EMBODIMENTS

The electrolytic solution of the present invention includes a nonaqueous solvent (I), an electrolyte salt (II), and a compound (III) represented by the following formula (1):

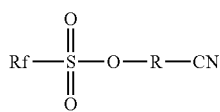
(1)

wherein Rf represents a C1-C20 linear or branched fluorinated alkyl group or a C3-C20 fluorinated alkyl group having a cyclic structure, R represents a C1-C20 linear or branched alkylene group or a C3-C20 alkylene group having a cyclic structure, hydrogen atoms in R may be partially or fully replaced by fluorine atoms, Rf and R may each contain an oxygen atom between carbon atoms when having a carbon number of 2 or more as long as oxygen atoms are not adjacent to each other.

Thus, use of the electrolytic solution of the present invention can provide electrochemical devices, such as lithium ion secondary batteries, which can restrain gas generation.

In the formula (1), Rf represents a C1-C20 linear or branched fluorinated alkyl group or a C3-C20 fluorinated alkyl group having a cyclic structure.

Examples of the C1-C20 linear or branched fluorinated alkyl group include $CF_3-$, $CF_3-CH_2-$, $CH_3-CF_2-$, $CF_3-CF_2-CF_2-$, $CF_3-CH_2-CF_2-$, $CF_3-CH(CF_3)-$, $CF_3-CF(CH_3)-$, $CH_3CF_2CF_2-$, $CH_2FCF_2-$, $CF_2HCF_2CF_2-$, $CF_3CF_2CF_2CF_2-$, and $CF_3CH_2CF_2CF_2-$.

Examples of the C3-C20 fluorinated alkyl group having a cyclic structure include, but not limited to, cyclopropyl, cyclobutyl, cyclohexyl, cycloheptyl, and cyclooctyl groups in which 1 to 5 hydrogen atoms are replaced by fluorine atoms.

Rf having a carbon number of 2 or more may contain an oxygen atom between carbon atoms (e.g., $CF_3-O-CF_2-$ structure) as long as oxygen atoms are not adjacent to each other. Preferably, Rf is a fluorinated alkyl group not containing an oxygen atom between carbon atoms.

Rf is preferably a C1-C20 linear or branched fluorinated alkyl group, more preferably $CF_3-$, $CF_3-CH_2-$, $CH_3-CF_2-$, $CF_3-CF_2-CF_2-$, $CF_3-CH_2-CF_2-$, $CF_3-CH(CF_3)-$, $CF_3-CF(CH_3)-$, $CH_3CF_2CF_2-$, $CH_2FCF_2CF_2-$, $CF_2HCF_2CF_2-$, $CF_3CF_2CF_2CF_2-$, or $CF_3CH_2CF_2CF_2-$, still more preferably $CF_3-$, $CF_3-CF_2-$, $CF_3-CF_2-CF_2-$, or $CF_3-CH_2-$, particularly preferably $CF_3-$ or $CF_3-CH_2-$.

In the formula (1), R represents a C1-C20 linear or branched alkylene group or a C3-C20 alkylene group having a cyclic structure. In either case, hydrogen atoms bonded to carbon atoms may be partially or fully replaced by fluorine atoms. However, the alkylene group is preferably free from fluorine atoms.

Examples of the C1-C20 linear or branched alkylene group include $-CH_2-$, $-CH_2-CH_2-$, $-CH(CH_3)-$, $-CH_2-CH_2-CH_2-$, $-CH(CH_3)-CH_2-$, and $-CH_2-CH(CH_3)-$.

Examples of the C3-C20 alkylene group having a cyclic structure include cyclopropylene, cyclobutylene, cyclopentylene, and cyclohexylene groups.

R having a carbon number of 2 or more may contain an oxygen atom between carbon atoms (e.g., $-CH_2-O-CH_2-$ structure) as long as oxygen atoms are not adjacent to each other. Preferably, R does not contain an oxygen atom between carbon atoms.

R is preferably a C1-C20 linear or branched alkylene group, more preferably $-CH_2-$, $-CH_2-CH_2-$, $-CH(CH_3)-$, $-CH_2-CH_2-CH_2-$, $-CH(CH_3)-CH_2-$, or $-CH_2-CH(CH_3)-$, still more preferably $-CH_2-$, $-CH_2-CH_2-$, or $-CH_2-CH_2-CH_2-$, particularly preferably $-CH_2-CH_2-$.

Specific chemical formulas of particularly preferable compounds (III) represented by the formula (1) are shown below.

(8)

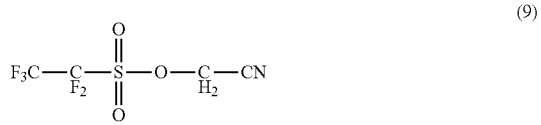
(9)

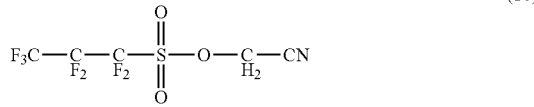
(10)

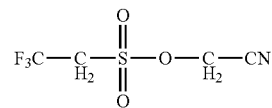
(11)

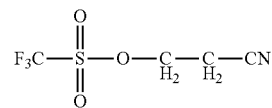
(12)

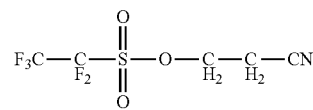
(13)

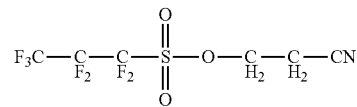
(14)

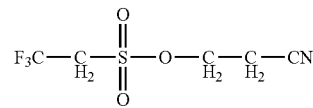
(15)

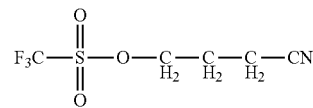
(16)

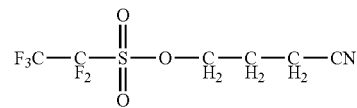
(17)

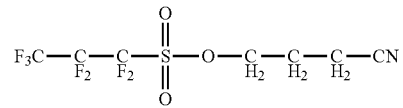
(18)

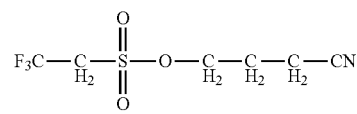
(19)

The compounds represented by the formulas (8) to (19) can be synthesized by, for example, allowing a fluoroalkylsulfonic acid chloride derivative to act on a cyano group-containing alcohol derivative and a base. Specifically, synthesis can be performed by the reaction shown in the following scheme:

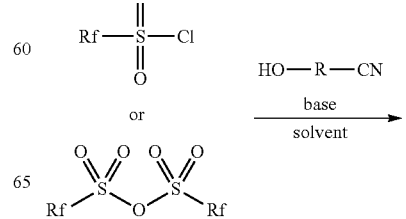

-continued

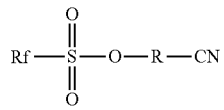

wherein Rf and R are as defined above.

The method of synthesizing a fluorinated sulfonic acid cyanoalkyl ester is more specifically described in the following in accordance with the synthetic route shown in the scheme.

For example, a compound represented by the formula (12) can be synthesized by a known synthesis method.

Anhydrous trifluoromethane sulfonic acid (1 equivalent) is reacted with pyridine (1 equivalent) and ethylene cyanohydrin (1 equivalent) in a dichloromethane solvent to give fluorine-containing alkyl sulfonic acid cyanoethyl ester represented by the formula (12).
Reference: Journal of Medicinal Chemistry, 1991, vol. 34, 1363-1368

A compound represented by the formula (15) can be synthesized by the following synthesis method.

A 100-mL three-neck flask is first charged with 2,2,2-trifluoroethane sulfonic acid chloride (14.1 g/77 mmol). Next, methylene chloride (14.1 mL) and ethylene cyanohydrin (5 g/70 mmol) are added thereto and cooled to 0° C. To the resulting mixture is slowly added dropwise triethylamine (8.54 g/84.4 mmol) with a 20-mL syringe. The mixture is reacted at 0° C. to room temperature for three hours to give a corresponding crude fluorinated sulfonic acid cyanoethyl ester.

The obtained crude substance is purified by column chromatography (silica gel: Fuji Silysia Chemical Ltd., methylene chloride solvent) to give fluorinated sulfonic acid cyanoalkyl ester at an isolated yield of 70%.

Identification can be performed by $^1$H-NMR.

FIG. 1 shows the result of $^1$H-NMR analysis of the compound prepared by the above synthesis method. In $^1$H-NMR, the solvent used is deuterochloroform. $^1$H-NMR (270 MHz, deuterated acetone) δ: 2.86 ppm (2H, t), 3.99 ppm (2H, q), 4.52 ppm (2H, t).

The molecular weight of the compound (III) represented by the formula (1) is preferably 153 or higher, more preferably 170 or higher, still more preferably 189 or higher. The molecular weight is preferably 289 or lower, more preferably 271 or lower.

The amount of the compound (III) represented by the formula (1) in the electrolytic solution of the present invention is preferably 0.01 to 12% by mass, more preferably 0.01 to 10% by mass. The compound in an amount within the above range leads to an electrolytic solution which restrains gas generation.

The amount of the compound (III) represented by the formula (1) in the electrolytic solution is preferably 0.1% by mass or more, more preferably 0.5% by mass or more, still more preferably 1% by mass or more, and preferably 8% by mass or less, more preferably 5% by mass or less.

The electrolytic solution of the present invention contains a nonaqueous solvent (I).

The nonaqueous solvent (I) preferably contains at least one carbonate selected from the group consisting of fluorinated cyclic carbonates, non-fluorinated cyclic carbonates, cyclic carbonates having an unsaturated bond, non-fluorinated acyclic carbonates, and fluorinated acyclic carbonates.

The term "non-fluorinated" refers to a structure free from a fluorine atom.

The fluorinated cyclic carbonate is a fluorinated saturated cyclic carbonate and is different from a cyclic carbonate having an unsaturated bond described later.

The nonaqueous solvent (I) more preferably contains a fluorinated cyclic carbonate for excellent oxidation resistance.

The nonaqueous solvent (I) more preferably contains a fluorinated acyclic carbonate for excellent oxidation resistance.

The nonaqueous solvent (I) is preferably one of the following solvents:
(a-1) a solvent containing a non-fluorinated cyclic carbonate and a non-fluorinated acyclic carbonate;
(a-2) a solvent containing a non-fluorinated cyclic carbonate, a non-fluorinated acyclic carbonate, and a cyclic carbonate having an unsaturated bond;
(a-3) a solvent containing a non-fluorinated cyclic carbonate, a non-fluorinated acyclic carbonate, and a fluorinated cyclic carbonate;
(a-4) a solvent containing a non-fluorinated cyclic carbonate, a non-fluorinated acyclic carbonate, a fluorinated cyclic carbonate, and a cyclic carbonate having an unsaturated bond;
(b-1) a solvent containing a fluorinated cyclic carbonate and a fluorinated acyclic carbonate;
(b-2) a solvent containing a fluorinated cyclic carbonate, a fluorinated acyclic carbonate, and a cyclic carbonate having an unsaturated bond.

In the case where the nonaqueous solvent (I) contains a non-fluorinated cyclic carbonate and a non-fluorinated acyclic carbonate, the volume ratio of the non-fluorinated cyclic carbonate and the non-fluorinated acyclic carbonate is preferably 19/1 to 1/19, more preferably 8/2 to 2/8.

In the case where the nonaqueous solvent (I) contains a fluorinated cyclic carbonate and a fluorinated acyclic carbonate, the volume ratio of the fluorinated cyclic carbonate and the fluorinated acyclic carbonate is preferably 19/1 to 1/19, more preferably 8/2 to 2/8.

The electrolytic solution of the present invention preferably further contains a cyclic carbonate having an unsaturated bond.

The nonaqueous solvent (I) preferably contains a cyclic carbonate. Examples of the cyclic carbonate include fluorinated cyclic carbonates, non-fluorinated cyclic carbonates, and cyclic carbonates having an unsaturated bond. The cyclic carbonate is preferably a fluorinated cyclic carbonate for excellent oxidation resistance.

(Fluorinated Cyclic Carbonate)

Examples of the fluorinated cyclic carbonate include a fluorinated cyclic carbonate (A) represented by the following formula (A):

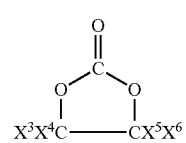

(A)

wherein $X^3$ to $X^6$ may be the same as or different from each other, and individually represent —H, —F, a fluorinated alkyl group which may optionally have an ether bond, or a fluorinated alkoxy group which may optionally have an ether bond; provided that at least one of $X^3$ to $X^6$ is —F.

The nonaqueous solvent (I) containing the fluorinated cyclic carbonate (A) allows an electrolytic solution that contains the solvent (I) to form a stable film on a negative electrode when the electrolytic solution is applied to a lithium ion secondary battery. Thereby, side reactions of the electrolytic solution on the negative electrode can sufficiently be restrained. This results in significantly stable, excellent charge and discharge characteristics.

The term "ether bond" herein means a bond represented by —O—.

In anticipation of a decrease in viscosity at low temperatures, an increase in the flash point, and the improvement in solubility of an electrolyte salt, $X^3$ to $X^6$ in the formula (A) each preferably represent —H, —F, a fluorinated alkyl group (a), a fluorinated alkyl group (b) having an ether bond, or a fluorinated alkoxy group (c).

In the formula (A), at least one of $X^3$ to $X^6$ is —F. In order to achieve good permittivity and oxidation resistance, at least one or two of $X^3$ to $X^6$ is/are preferably —F.

The fluorinated alkyl group (a) is an alkyl group in which at least one hydrogen atom is replaced by a fluorine atom. The carbon number of the fluorinated alkyl group (a) is preferably 1 to 20, more preferably 2 to 17, still more preferably 2 to 7, particularly preferably 2 to 5.

Too large a carbon number may lead to deterioration in low-temperature characteristics and a decrease in solubility of an electrolyte salt. Too small a carbon number may lead to a decrease in solubility of an electrolyte salt, deterioration in discharge efficiency, and an increase in viscosity, for example.

Examples of the fluorinated alkyl group (a) in which the carbon number is 1 include $CFH_2$—, $CF_2H$—, and $CF_3$—.

In order to achieve good solubility of an electrolyte salt, the fluorinated alkyl group (a) in which the carbon number is 2 or greater is preferably a fluorinated alkyl group represented by the following formula (a-1):

$$R^3-R^4- \quad (a\text{-}1)$$

wherein $R^3$ represents an alkyl group which may optionally have a fluorine atom and which has a carbon number of 1 or greater; and $R^4$ represents a C1-C3 alkylene group which may optionally have a fluorine atom, provided that at least one of $R^3$ and $R^4$ has a fluorine atom. $R^3$ and $R^4$ each may further have an atom other than the carbon atom, hydrogen atom, and fluorine atom.

$R^3$ is an alkyl group which may optionally have a fluorine atom and which has a carbon number of 1 or greater. $R^3$ preferably represents a C1-C16 linear or branched alkyl group. The carbon number of $R^3$ is more preferably 1 to 6, still more preferably 1 to 3.

Specifically, for example, $CH_3$—, $CH_3CH_2$—, $CH_3CH_2CH_2$—, $CH_3CH_2CH_2CH_2$—, and the groups represented by the following formulas:

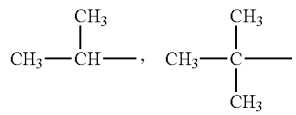

can be used as a linear or branched non-fluorinated alkyl group for $R^3$.

Examples of the linear alkyl group having a fluorine atom for $R^3$ include $CF_3$—, $CF_3CH_2$—, $CF_3CF_2$—, $CF_3CH_2CH_2$—, $CF_3CH_2CH_2$—, $CF_3CF_2CH_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CF_2CF_2CH_2CH_2$—, $CF_3CF_2CF_2CF_2CH_2$—, $CF_3CF_2CH_2CF_2CH_2$—, $CF_3CF_2CH_2CH_2CF_2$—, $CF_3CF_2CF_2CF_2CH_2CH_2$—, $CF_3CF_2CH_2CF_2CH_2CH_2$—, $HCF_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CF_2CH_2CH_2$—, $FCH_2$—, $FCH_2CH_2$—, $FCH_2CF_2$—, $FCH_2CF_2CH_2$—, $FCH_2CF_2CF_2$—, $CH_3CF_2CH_2$—, $CH_3CF_2CF_2$—, $CH_3CF_2CH_2CF_2$—, $CH_3CF_2CF_2CF_2$—, $CH_3CH_2CF_2CF_2$—, $CH_3CF_2CH_2CF_2CH_2$—, $CH_3CF_2CF_2CF_2CH_2$—, $CH_3CF_2CF_2CH_2CH_2$—, $CH_3CH_2CF_2CF_2CH_2$—, $CH_3CF_2CH_2CF_2CH_2$—, $CH_3CF_2CH_2CF_2CH_2CH_2$—, $CH_3CF_2CH_2CF_2CH_2CH_2$—, $HCFClCF_2CH_2$—, $HCF_2CFClCH_2$—, $HCF_2CFClCF_2CFClCH_2$—, and $HCFClCF_2CFClCF_2CH_2$—.

Preferable examples of the branched alkyl group having a fluorine atom for $R^3$ include the groups represented by the following formulas.

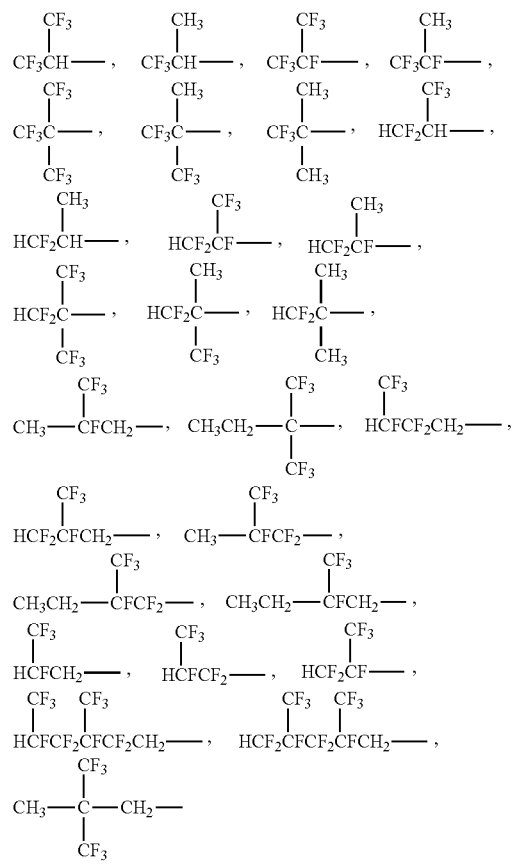

If the group has a branch represented by —$CH_3$ or —$CF_3$, for example, the viscosity is likely to increase. Thus, the number of such branches is more preferably small (one) or zero.

$R^4$ represents a C1-C3 alkylene group which may optionally have a fluorine atom. $R^4$ may be a linear or branched group. Examples of the minimum structural units constituting such a linear or branched alkylene group include the following. $R^4$ comprises one of these units or a combination of these units.

(I) Linear Minimum Structural Units:
—CH$_2$—, —CHF—, —CF$_2$—, —CHCl—, —CFCl—, —CCl$_2$—

(II) Branched Minimum Structural Units:

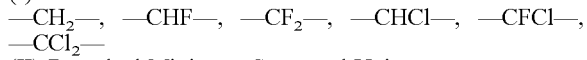

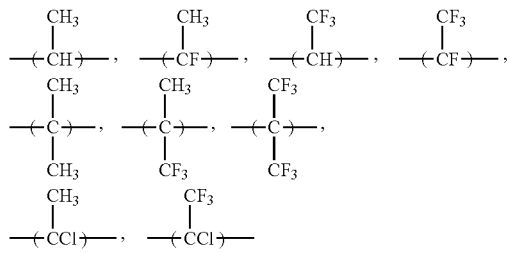

Preferred among these exemplified groups are structural units having no Cl because such units cause no dehydrochlorination due to a base so that the units are more stable.

If R$^4$ is a linear group, the group consists only of the above linear minimum structural units, and it is preferably —CH$_2$—, —CH$_2$CH$_2$—, or CF$_2$—. In order to further improve the solubility of an electrolyte salt, —CH$_2$— or —CH$_2$CH$_2$— is more preferred.

If R$^4$ is a branched group, the group comprises at least one of the above branched minimum structural units. Preferable examples thereof include those represented by the formula —(CX$^a$X$^b$)— (wherein X$^a$ represents H, F, CH$_3$, or CF$_3$; and X$^b$ represents CH$_3$ or CF$_3$, when X$^b$ is CF$_3$, X$^a$ is H or CH$_3$). Such groups can much further improve the solubility of an electrolyte salt.

Preferably, for example, any of CF$_3$CF$_2$—, HCF$_2$CF$_2$—, H$_2$CFCF$_2$—, CH$_3$CF$_2$—, CF$_3$CF$_2$CF$_2$—, HCF$_2$CF$_2$CF$_2$—, H$_2$CFCF$_2$CF$_2$—, CH$_3$CF$_2$CF$_2$—, CF$_3$CH$_2$—, HCF$_2$CH$_2$—, CF$_3$CF$_2$CH$_2$—, HCF$_2$CF$_2$CH$_2$—, H$_2$CFCF$_2$CH$_2$—, CH$_3$F$_2$CH$_2$—, CF$_3$CF$_2$CF$_2$CH$_2$—, CF$_3$CF$_2$CF$_2$CF$_2$CH$_2$—, HCF$_2$CF$_2$CF$_2$CH$_2$—, H$_2$CFCF$_2$CF$_2$CH$_2$—, CH$_3$CF$_2$CF$_2$CH$_2$—, CF$_3$CH$_2$CH$_2$—, HCF$_2$CH$_2$CH$_2$—, CF$_3$CF$_2$CH$_2$CH$_2$—, HCF$_2$CF$_2$CH$_2$CH$_2$—, H$_2$CFCF$_2$CH$_2$CH$_2$—, CH$_3$CF$_2$CH$_2$CH$_2$—, CF$_3$CF$_2$CF$_2$CH$_2$CH$_2$—, HCF$_2$CF$_2$CH$_2$CH$_2$—, H$_2$CFCF$_2$CF$_2$CH$_2$CH$_2$—, CH$_3$CF$_2$CF$_2$CH$_2$CH$_2$—, and the groups represented by the following formulas:

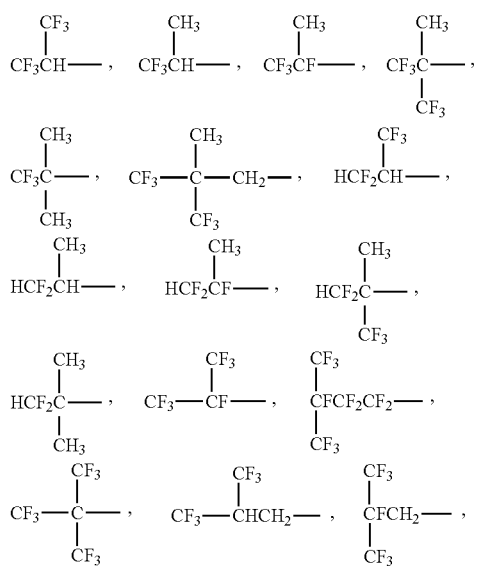

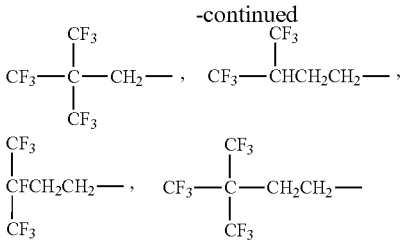

can be used as a fluorinated alkyl group (a).

Specifically, any of CF$_3$CH$_2$—, HCF$_2$CH$_2$—, CF$_3$CF$_2$CH$_2$—, HCF$_2$CF$_2$CH$_2$—, H$_2$CFCF$_2$CH$_2$—, CH$_3$CF$_2$CH$_2$—, CF$_3$CF$_2$CF$_2$CH$_2$—, HCF$_2$CF$_2$CF$_2$CH$_2$—, H$_2$CFCF$_2$CF$_2$CH$_2$—, CH$_3$CF$_2$CF$_2$CH$_2$—, CF$_3$CH$_2$CH$_2$—, HCF$_2$CH$_2$CH$_2$—, CF$_3$CF$_2$CH$_2$CH$_2$—, HCF$_2$CF$_2$CH$_2$CH$_2$—, H$_2$CFCF$_2$CH$_2$CH$_2$—, CH$_3$CF$_2$CH$_2$CH$_2$—, CF$_3$CF$_2$CF$_2$CH$_2$CH$_2$—, HCF$_2$CF$_2$CF$_2$CH$_2$CH$_2$—, H$_2$CFCF$_2$CF$_2$CH$_2$CH$_2$—, CH$_3$CF$_2$CF$_2$CH$_2$CH$_2$—, and the groups represented by the following formulas:

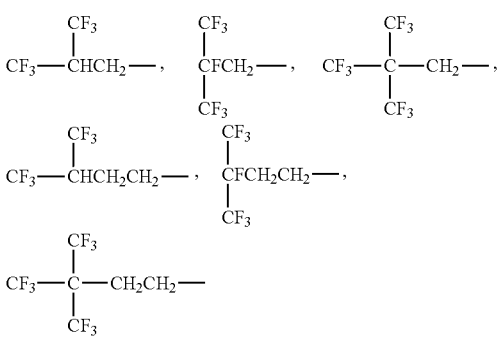

can be preferably used as a linear fluorinated alkyl group (a) for R$^4$.

Specifically, for example, the group represented by the following formulas:

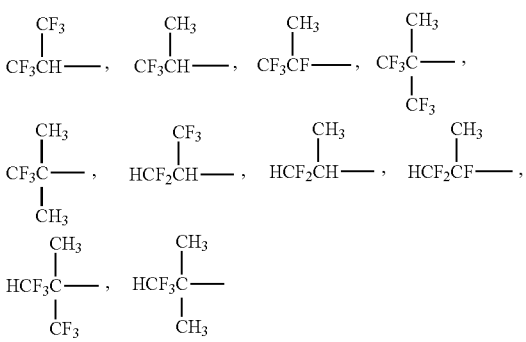

can be preferably used as a branched fluorinated alkyl group (a) for R$^4$.

The fluorinated alkyl group (b) having an ether bond is an alkyl group having an ether bond in which at least one hydrogen atom is replaced by a fluorine atom. The fluorinated alkyl group (b) having an ether bond preferably has a carbon number of 2 to 17. Too large a carbon number may increase the viscosity of the fluorinated cyclic carbonate (A) and may increase the number of fluorine-containing groups, thereby reducing the solubility of an electrolyte salt due to a reduction in permittivity and reducing the compatibility with other solvents. Thus, the carbon number of the fluorinated alkyl group (b) having an ether bond is preferably 2 to 10, more preferably 2 to 7.

The alkylene group which constitutes the ether segment of the fluorinated alkyl group (b) having an ether bond may be a linear or branched alkylene group. Examples of the minimum structural units constituting such a linear or branched alkylene group are as follows.

(I) Linear Minimum Structural Units:
—CH$_2$—, —CHF—, —CF$_2$—, —CHCl—, —CFCl—, —CCl$_2$—

(II) Branched Minimum Structural Units:

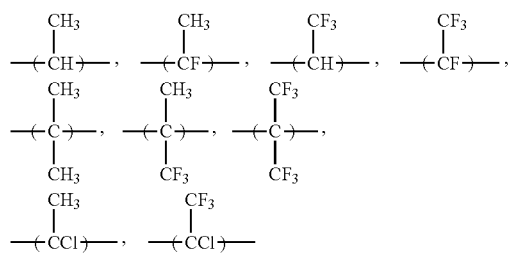

The alkylene group may be formed by one of these minimum structural units alone, or may be formed by a combination of linear units (I), of branched units (II), or of a linear unit (I) and a branched unit (II). Preferable examples will be mentioned in detail later.

Preferred among these exemplified groups are structural units having no Cl because such groups cause no dehydrochlorination due to a base so that the groups are more stable.

Still more preferable examples of the fluorinated alkyl group (b) having an ether bond include those represented by the formula (b-1):

$$R^5—(OR^6)_{n1}— \qquad (b\text{-}1)$$

wherein R$^5$ preferably represents a C1-C6 alkyl group which may optionally have a fluorine atom; R$^6$ preferably represents a C1-C4 alkylene group which may optionally have a fluorine atom; and n1 is an integer of 1 to 3; provided that at least one of R$^5$ and R$^6$ has a fluorine atom.

Examples of the groups for R$^5$ and R$^6$ include the following, and any combination of these groups can provide the fluorinated alkyl group (b) having an ether bond represented by the formula (b-1). Still, the groups are not limited thereto.

(1) R is preferably an alkyl group represented by the formula: $X^c{}_3C—(R^7)_{n2}—$ (wherein three $X^c$'s may be the same as or different from each other, and individually represent H or F; R$^7$ represents a C1-C5 alkylene group which may optionally have a fluorine atom; and n2 is 0 or 1).

If n2 is 0, R$^5$ is CH$_3$—, CF$_3$—, HCF$_2$—, or H$_2$CF—.

If n2 is 1, specific examples of the linear group for R$^5$ include CF$_3$CH$_2$—, CF$_3$CF$_2$—, CF$_3$CH$_2$CH$_2$—, CF$_3$CF$_2$CH$_2$—, CF$_3$CF$_2$CF$_2$—, CF$_3$CH$_2$CF$_2$—, CF$_3$CH$_2$CH$_2$CH$_2$—, CF$_3$CF$_2$CH$_2$CH$_2$—, CF$_3$CH$_2$CF$_2$CH$_2$—, CF$_3$CF$_2$CF$_2$CH$_2$—, CF$_3$CF$_2$CF$_2$CF$_2$—, CF$_3$CF$_2$CH$_2$CF$_2$—, CF$_3$CH$_2$CH$_2$CH$_2$CH$_2$—, CF$_3$CF$_2$CH$_2$CH$_2$CH$_2$—, CF$_3$CF$_2$CH$_2$CH$_2$—, CF$_3$CF$_2$CF$_2$CH$_2$—, CF$_3$CF$_2$CH$_2$CH$_2$CH$_2$—, CF$_3$CF$_2$CH$_2$CH$_2$CH$_2$CH$_2$—, CF$_3$CF$_2$CF$_2$CF$_2$CH$_2$CH$_2$—, CF$_3$CF$_2$CH$_2$CH$_2$CH$_2$—, CF$_3$CF$_2$CF$_2$CF$_2$CH$_2$CH$_2$—, CF$_3$CF$_2$CH$_2$CF$_2$CH$_2$CH$_2$—, HCF$_2$CH$_2$—, HCF$_2$CF$_2$—, HCF$_2$CH$_2$CH$_2$—, HCF$_2$CF$_2$CH$_2$—, HCF$_2$CH$_2$CF$_2$—, HCF$_2$CF$_2$CH$_2$CH$_2$—, HCF$_2$CH$_2$CF$_2$CH$_2$—, HCF$_2$CF$_2$CF$_2$CF$_2$—, HCF$_2$CF$_2$CH$_2$CH$_2$CH$_2$—, HCF$_2$CH$_2$CF$_2$CH$_2$CH$_2$—, HCF$_2$CF$_2$CF$_2$CF$_2$CH$_2$—, HCF$_2$CF$_2$CF$_2$CF$_2$CH$_2$CH$_2$CH$_2$—, FCH$_2$CH$_2$—, FCH$_2$CF$_2$—, FCH$_2$CF$_2$CH$_2$—, CH$_3$CF$_2$—, CH$_3$CH$_2$—, CH$_3$CF$_2$CH$_2$—, CH$_3$CF$_2$CF$_2$—, CH$_3$CH$_2$CH$_2$—, CH$_3$CF$_2$CH$_2$CF$_2$—, CH$_3$CF$_2$CF$_2$CF$_2$—, CH$_3$CH$_2$CF$_2$CF$_2$—, CH$_3$CH$_2$CH$_2$CH$_2$—, CH$_3$CF$_2$CH$_2$CF$_2$CH$_2$—, CH$_3$CF$_2$CF$_2$CF$_2$CH$_2$—, CH$_3$CF$_2$CF$_2$CH$_2$CH$_2$—, CH$_3$CH$_2$CF$_2$CF$_2$CH$_2$—, CH$_3$CF$_2$CH$_2$CF$_2$CH$_2$CH$_2$—, and CH$_3$CH$_2$CF$_2$CF$_2$CH$_2$CH$_2$—.

If n2 is 1, for example, any of the groups represented by the following formulas:

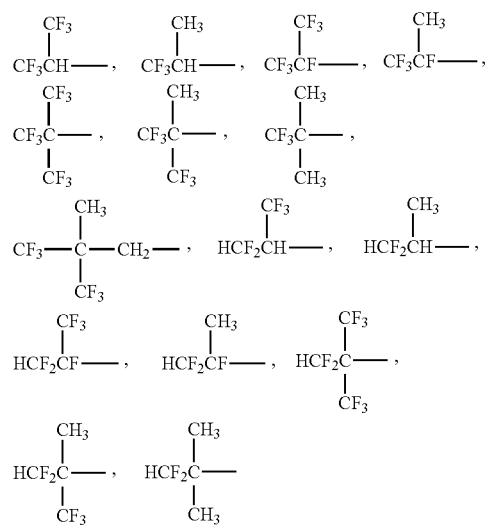

can be used as a branched group for R$^5$.

If the group for R$^5$ has a branch such as —CH$_3$ or —CF$_3$, the viscosity is likely to increase. Thus, the group for R$^5$ is more preferably a linear group.

(2) In the segment —(OR$^6$)$_{n1}$— of the formula (b-1), n1 is an integer of 1 to 3, preferably 1 or 2. If n1 is 2 or 3, R$^6$'s may be the same as or different from each other.

Preferable specific examples of the group for R$^6$ include the following linear or branched groups.

Examples of the linear group include —CH$_2$—, —CHF—, —CF$_2$—, —CH$_2$CH$_2$—, —CF$_2$CH$_2$—, —CF$_2$CF$_2$—, —CH$_2$CF$_2$—, —CH$_2$CH$_2$CH$_2$—, —CH$_2$CH$_2$CF$_2$—, —CH$_2$CF$_2$CH$_2$—, —CH$_2$CF$_2$CF$_2$—, —CF$_2$CH$_2$CH$_2$—, —CF$_2$CF$_2$CH$_2$—, —CF$_2$CH$_2$CF$_2$—, and —CF$_2$CF$_2$CF$_2$—.

The groups represented by the following formulas:

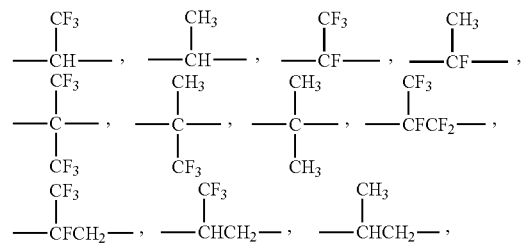

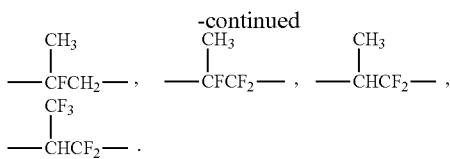

can be used as a branched group.

The fluorinated alkoxy group (c) is an alkoxy group in which at least one hydrogen atom is replaced by a fluorine atom. The fluorinated alkoxy group (c) preferably has a carbon number of 1 to 17. The carbon number is more preferably 1 to 6.

The fluorinated alkoxy group (c) is particularly preferably a fluorinated alkoxy group represented by the formula: $X^d{}_3C-(R^8)_{n3}-O-$ (wherein three $X^d$'s may be the same as or different from each other, and individually represent H or F; $R^8$ preferably represents a C1-C5 alkylene group which may optionally have a fluorine atom; and n3 is 0 or 1; provided that any of the three $X^d$'s is a fluorine atom).

Specific examples of the fluorinated alkoxy group (c) include fluorinated alkoxy groups which are formed by bonding an oxygen atom to an end of the alkyl group exemplified for $R^3$ in the formula (a-1).

The fluorinated alkyl group (a), the fluorinated alkyl group (b) having an ether bond, and the fluorinated alkoxy group (c) each preferably have a fluorine content of 10% by mass or more. Too low a fluorine content may fail to achieve an effect of increasing the flash point. Thus, the fluorine content is more preferably 12% by mass or more, still more preferably 15% by mass or more. The upper limit thereof is usually 85% by mass.

The fluorine contents of the fluorinated alkyl group (a), the fluorinated alkyl group (B) having an ether bond, and the fluorinated alkoxy group (c) are values calculated by the formula: {(number of fluorine atoms×19)/formula weight of the group}×100(%), based on the respective structural formulas.

In order to achieve good permittivity and oxidation resistance, the fluorine content in the whole fluorinated cyclic carbonate (A) is preferably 5% by mass or more, more preferably 10% by mass or more. The upper limit thereof is usually 76% by mass.

The fluorine content in the whole fluorinated cyclic carbonate (A) is a value calculated by the following formula: {(number of fluorine atoms×19)/molecular weight of fluorinated cyclic carbonate (A)}×100(%) based on the structural formula of the fluorinated cyclic carbonate (A).

Specific examples of the fluorinated cyclic carbonate (A) include those represented by the following formulas:

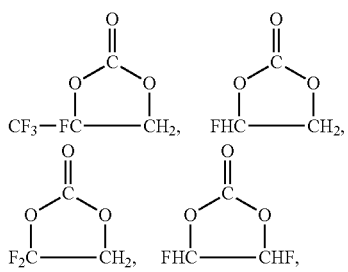

which are fluorinated cyclic carbonates having a high withstand voltage and leading to good solubility of an electrolyte salt.

In addition, those represented by the following formulas:

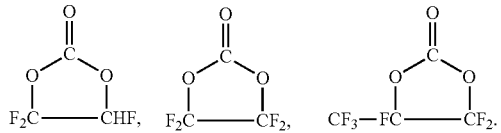

can also be used.

The fluorinated cyclic carbonate (A) in the present invention is not limited to the aforementioned specific examples.

Examples of the fluorinated cyclic carbonate include a fluorinated cyclic carbonate (B) represented by the formula (B):

wherein $X^3$ to $X^6$ may be the same as or different from each other, and individually represent —H, a fluorinated alkyl group which may optionally have an ether bond, or a fluorinated alkoxy group which may optionally have an ether bond.

Containing the fluorinated cyclic carbonate (B) leads to more stable, excellent charge and discharge characteristics.

In the formula (B), at least one of $X^3$ to $X^6$ is —H, a fluorinated alkyl group which may optionally have an ether bond, or a fluorinated alkoxy group which may optionally have an ether bond. In order to achieve good permittivity and oxidation resistance, one or two of $X^3$ to $X^6$ is/are preferably —H, a fluorinated alkyl group which may optionally have an ether bond, or a fluorinated alkoxy group which may optionally have an ether bond.

In anticipation of a decrease in viscosity at low temperatures, an increase in the flash point, and the improvement in solubility of an electrolyte salt, at least one of $X^3$ to $X^6$ is preferably a fluorinated alkyl group (a), a fluorinated alkyl group (b) having an ether bond, or a fluorinated alkoxy group (c).

Examples of the fluorinated alkyl group (a), the fluorinated alkyl group (b) having an ether bond, and the fluorinated alkoxy group (c) include the same fluorinated alkyl groups (a), fluorinated alkyl groups (b) having an ether bond, and fluorinated alkoxy groups (c) for $X^3$ to $X^6$ in the formula (A).

Specifically, for example, the fluorinated cyclic carbonate (B) may be the following.

Those represented by the following formulas:

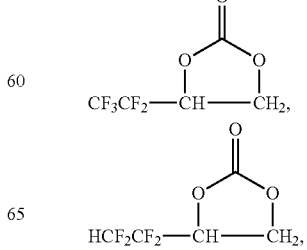

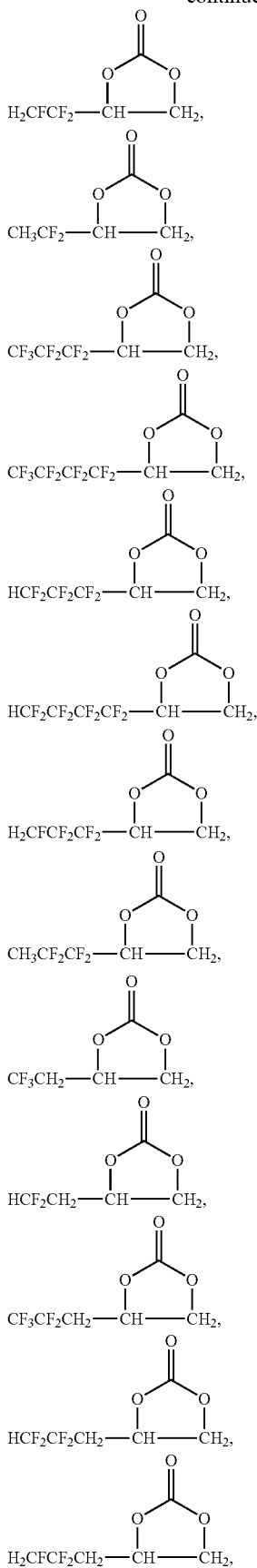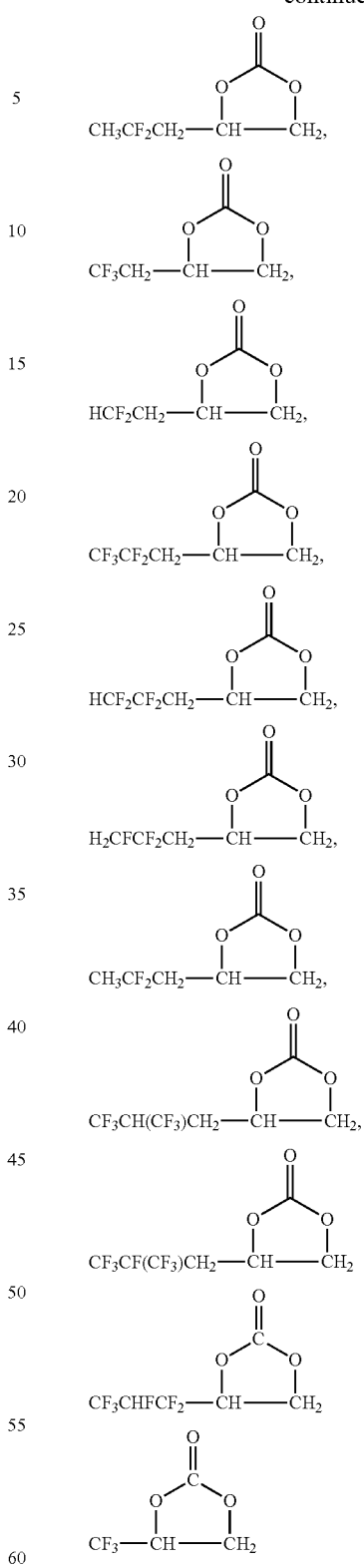
can be used as a fluorinated cyclic carbonate (B) represented by the formula (B) in which at least one of $X^3$ to $X^6$ is a fluorinated alkyl group (a) and the others thereof are —H.
Specifically, for example, those represented by the following formulas:

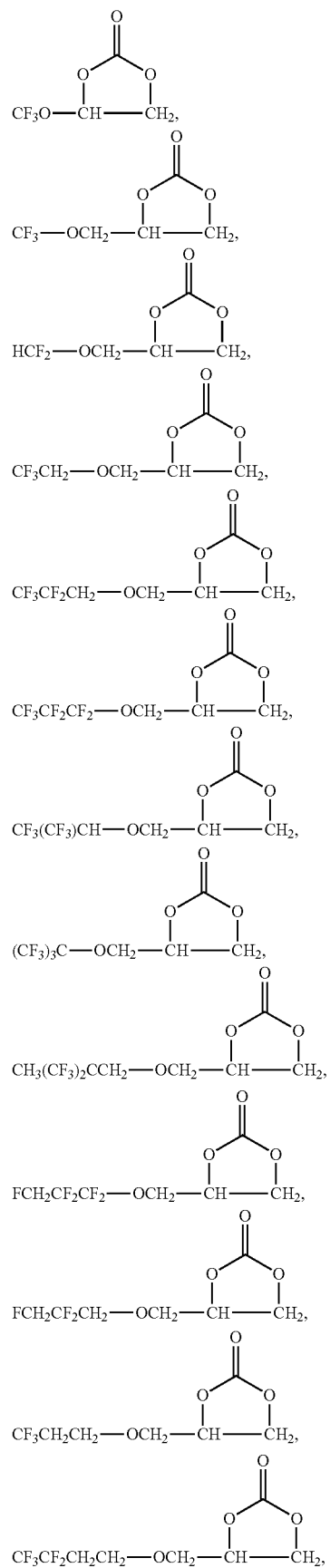
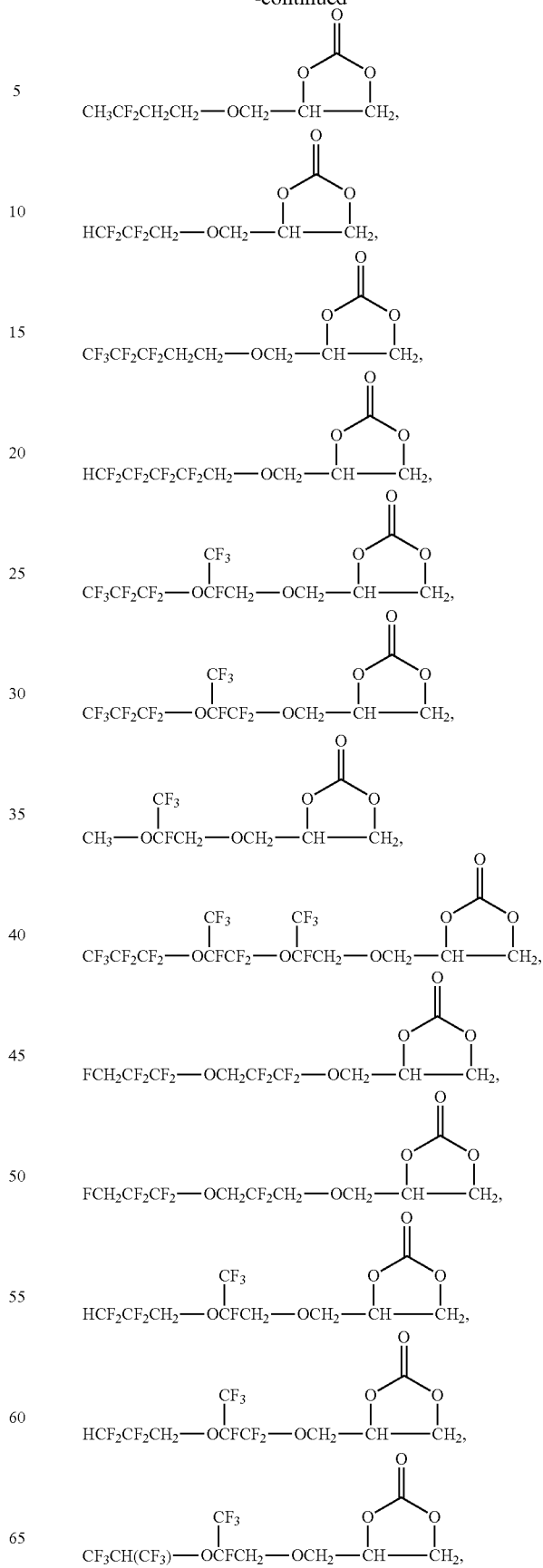

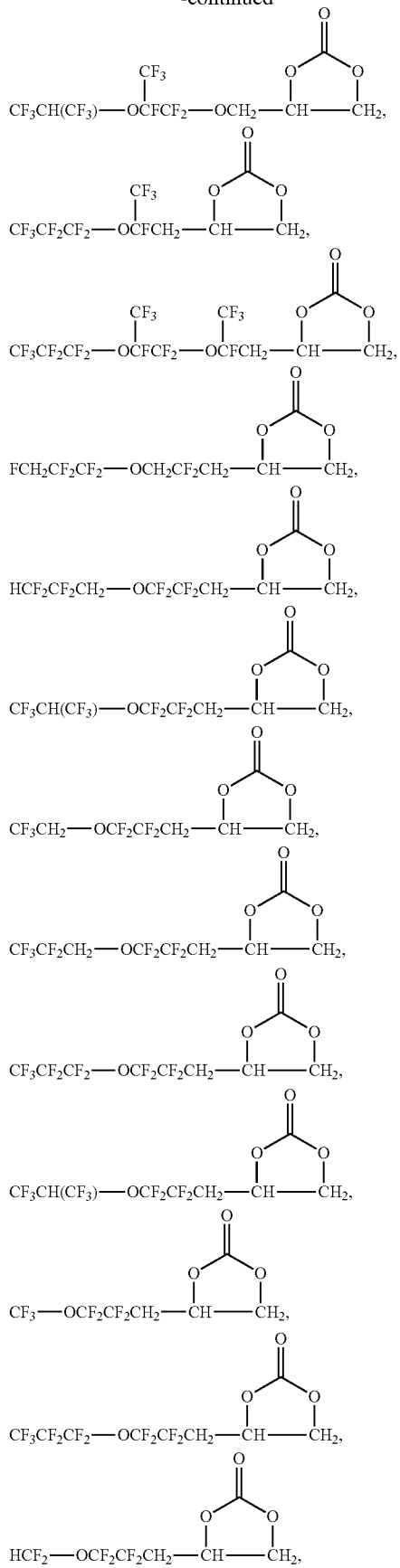

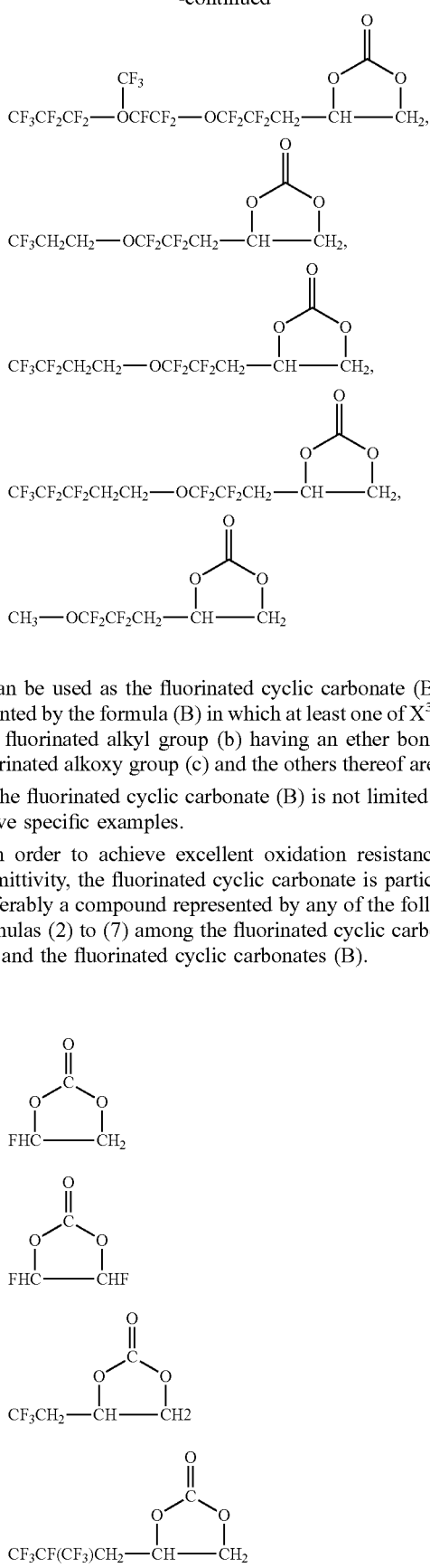

can be used as the fluorinated cyclic carbonate (B) represented by the formula (B) in which at least one of $X^3$ to $X^6$ is a fluorinated alkyl group (b) having an ether bond or a fluorinated alkoxy group (c) and the others thereof are —H.

The fluorinated cyclic carbonate (B) is not limited to the above specific examples.

In order to achieve excellent oxidation resistance and permittivity, the fluorinated cyclic carbonate is particularly preferably a compound represented by any of the following formulas (2) to (7) among the fluorinated cyclic carbonates (A) and the fluorinated cyclic carbonates (B).

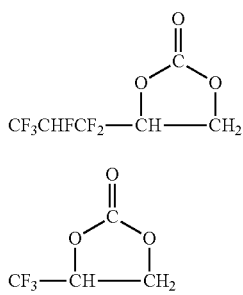

The amount of the fluorinated cyclic carbonates (A) and (B) in 100% by volume of the nonaqueous solvent (I) is preferably 0.5% by volume or more, more preferably 5% by volume or more, still more preferably 10% by volume or more, and preferably 50% by volume or less, more preferably 35% by volume or less, still more preferably 25% by volume or less.

(Non-Fluorinated Cyclic Carbonate)

Examples of the non-fluorinated cyclic carbonate include cyclic carbonates having a C2-C4 alkylene group.

Specific examples of the non-fluorinated cyclic carbonates having a C2-C4 alkylene group include ethylene carbonate, propylene carbonate, and butylene carbonate. Particularly preferred are ethylene carbonate and propylene carbonate because they can improve the battery characteristics owing to the improvement in degree of dissociation of lithium ions.

These non-fluorinated cyclic carbonates may be used alone or in any combination of two or more at any ratio.

The non-fluorinated cyclic carbonate may be used in any amount that does not significantly impair the effects of the present invention. For a single non-fluorinated cyclic carbonate, the amount thereof is preferably 5% by volume or more, more preferably 10% by volume or more in 100% by volume of the nonaqueous solvent (I). The non-fluorinated cyclic carbonate in an amount within this range can eliminate a decrease in electric conductivity due to a decrease in permittivity of the electrolytic solution, and thus is likely to give large-current discharge characteristics, stability against a negative electrode, and cycle characteristics of electrochemical devices comprising the electrolytic solution each within a favorable range.

The amount thereof is preferably 95% by volume or less, more preferably 90% by volume or less, still more preferably 85% by volume or less. The non-fluorinated cyclic carbonate in an amount within this range can provide a viscosity of the electrolytic solution within an appropriate range and restrain a decrease in ion conductivity, thereby giving load characteristics within a favorable range to electrochemical devices comprising the electrolytic solution.

(Cyclic Carbonate Having Unsaturated Bond)

The cyclic carbonate having an unsaturated bond (hereinafter, also referred to as an "unsaturated cyclic carbonate") can be any unsaturated carbonate which is a cyclic carbonate having a carbon-carbon double bond or a carbon-carbon triple bond. The unsaturated cyclic carbonate includes cyclic carbonates having an aromatic ring.

Examples of the unsaturated cyclic carbonate include vinylene carbonates, ethylene carbonates substituted with a substituent having an aromatic ring, a carbon-carbon double bond, or a carbon-carbon triple bond, phenyl carbonates, vinyl carbonates, allyl carbonates, and catechol carbonates.

Examples of the vinylene carbonates include vinylene carbonate, methyl vinylene carbonate, 4,5-dimethyl vinylene carbonate, phenyl vinylene carbonate, 4,5-diphenyl vinylene carbonate, vinyl vinylene carbonate, 4,5-divinyl vinylene carbonate, allyl vinylene carbonate, 4,5-diallyl vinylene carbonate, 4-fluorovinylene carbonate, 4-fluoro-5-methyl vinylene carbonate, 4-fluoro-5-phenyl vinylene carbonate, 4-fluoro-5-vinyl vinylene carbonate, and 4-allyl-5-fluorovinylene carbonate.

Specific examples of the ethylene carbonates substituted with a substituent having an aromatic ring, a carbon-carbon double bond, or a carbon-carbon triple bond include vinyl ethylene carbonate, 4,5-divinyl ethylene carbonate, 4-methyl-5-vinyl ethylene carbonate, 4-allyl-5-vinyl ethylene carbonate, ethynyl ethylene carbonate, 4,5-diethynyl ethylene carbonate, 4-methyl-5-ethynyl ethylene carbonate, 4-vinyl-5-ethynyl ethylene carbonate, 4-allyl-5-ethynyl ethylene carbonate, phenyl ethylene carbonate, 4,5-diphenyl ethylene carbonate, 4-phenyl-5-vinyl ethylene carbonate, 4-allyl-5-phenyl ethylene carbonate, allyl ethylene carbonate, 4,5-diallyl ethylene carbonate, and 4-methyl-5-allyl ethylene carbonate.

Particularly preferable examples of the unsaturated cyclic carbonate to be used in combination with the compound represented by the formula (1) include vinylene carbonate, methyl vinylene carbonate, 4,5-dimethyl vinylene carbonate, vinyl vinylene carbonate, 4,5-vinyl vinylene carbonate, allyl vinylene carbonate, 4,5-diallyl vinylene carbonate, vinyl ethylene carbonate, 4,5-divinyl ethylene carbonate, 4-methyl-5-vinyl ethylene carbonate, allyl ethylene carbonate, 4,5-diallyl ethylene carbonate, 4-methyl-5-allyl ethylene carbonate, 4-allyl-5-vinyl ethylene carbonate, ethynyl ethylene carbonate, 4,5-diethynyl ethylene carbonate, 4-methyl-5-ethynyl ethylene carbonate, and 4-vinyl-5-ethynyl ethylene carbonate. Particularly preferred are vinylene carbonate, vinyl ethylene carbonate, and ethynyl ethylene carbonate because they can form a more stable interface protective film.

The unsaturated cyclic carbonate may have any molecular weight that does not significantly impair the effects of the present invention. The molecular weight is preferably 80 or higher and 250 or lower. The unsaturated cyclic carbonate having a molecular weight within this range is likely to assure the solubility in a nonaqueous electrolytic solution and enable sufficient achievement of the effects of the present invention. The molecular weight of the unsaturated cyclic carbonate is more preferably 85 or higher, and more preferably 150 or lower.

The unsaturated cyclic carbonate can be produced by any known production method.

The unsaturated cyclic carbonates can be used alone or in combination of two or more at any ratio.

The unsaturated cyclic carbonate can be used in any amount that does not significantly impair the effects of the present invention. The amount of the unsaturated cyclic carbonate is preferably 0.001% by mass or more, more preferably 0.01% by mass or more, still more preferably 0.1% by mass or more in 100% by mass of the nonaqueous solvent (I). The amount thereof is also preferably 5% by mass or less, more preferably 4% by mass or less, still more preferably 3% by mass or less. The carbonate in an amount within the above range is likely to allow electrochemical devices comprising the electrolytic solution to exert a sufficient effect of improving the cycle characteristics and eliminate the deterioration in high-temperature storage characteristics, an increase in the amount of gas generated, and a decrease in discharge capacity retention ratio.

(Non-Fluorinated Acyclic Carbonate)

The non-fluorinated acyclic carbonate is preferably a C3-C7 acyclic carbonate, and more preferably a C3-C7 dialkyl carbonate, having no fluorine atom.

Examples of the non-fluorinated acyclic carbonate include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate.

Preferred are dimethyl carbonate, diethyl carbonate, di-n-propyl carbonate, diisopropyl carbonate, n-propyl isopropyl carbonate, ethyl methyl carbonate, and methyl-n-propyl carbonate, and particularly preferred are dimethyl carbonate, diethyl carbonate, and ethyl methyl carbonate.

These non-fluorinated acyclic carbonates may be used alone or in combination of two or more at any ratio.

(Fluorinated Acyclic Carbonate)

The fluorinated acyclic carbonate is an acyclic carbonate having a fluorine atom.

The fluorinated acyclic carbonate has a fluorine content of 10 to 70.0% by mass. An electrolytic solution containing a fluorinated acyclic carbonate having a fluorine content within the above range can improve the high-temperature storage characteristics and cycle characteristics of electrochemical devices. The lower limit of the fluorine content is preferably 25% by mass, more preferably 30.0% by mass. The upper limit of the fluorine content is preferably 60.0% by mass, more preferably 55.0% by mass.

The fluorine content is a value calculated by the formula: {(number of fluorine atoms×19)/molecular weight of fluorinated acyclic carbonate}×100(%), based on the structural formula of the fluorinated acyclic carbonate.

The fluorinated acyclic carbonate is preferably, for example, a fluorine-containing carbonate represented by the formula (C):

$$Rf^5OCOORf^6 \quad (C)$$

wherein $Rf^5$ and $Rf^6$ are the same as or different from each other and each represent a C1-C11 alkyl group which may optionally have a fluorine atom and an ether bond; provided that at least one of $Rf^5$ and $Rf^6$ is a C1-C11 fluorine-containing alkyl group which may optionally have an ether bond, because such a fluorine-containing carbonate has high flame retardancy and favorable rate characteristics and oxidation resistance. $Rf^5$ and $Rf^6$ each preferably have a carbon number of 1 to 5.

Examples of $Rf^5$ and $Rf^6$ include: fluorine-containing alkyl groups such as $CF_3-$, $CF_3CH_2-$, $H_2CFCH_2-$, $HCF_2CF_2CH_2-$, $CF_3CF_2CH_2-$, $(CF_3)_2CH-$, $H(CF_2CF_2)_2CH_2-$, and $CF_3-CF_2-$; fluorine-containing alkyl groups having an ether bond such as $C_3F_7OCF(CF_3)CH_2-$, $C_3F_7OCF(CF_3)CF_2OCF(CF_3)CH_2-$, $C_2F_5OCF(CF_3)CH_2-$, $CF_3OCF(CF_3)CH_2-$, and $C_2F_5OC(CF_3)_2CH_2-$; and fluorine-free alkyl groups such as $CH_3-$, $C_2H_5-$, $C_3H_7-$, and $C_4H_5-$. A combination which sets the fluorine content of the fluorinated acyclic carbonate within the above range may be chosen out of these groups.

Specific examples of the fluorinated acyclic carbonate include $FCH_2CH_2OCOOCH_3$, $HCF_2CH_2OCOOCH_3$, $(CF_3CH_2O)_2CO$, $(HCF_2CF_2CH_2O)_2CO$, $(CF_3CF_2CH_2O)_2CO$, $((CF_3)_2CHO)_2CO$, $(H(CF_2CF_2)_2CH_2O)_2CO$, $(C_3F_7OCF(CF_3)CF_2OCF(CF_3)CH_2O)_2CO$, $(C_3F_7OCF(CF_3)CH_2O)_2CO$, $CH_3OCOOCH_2CF_2CF_3$, $CH_3OCOOCH_2CF_2CF_2H$, $C_2H_5OCOOCH_2CF_2CF_2H$, $CH_3OCOOCH_2CF_3$, $C_2H_5OCOOCH_2CF_3$, $CF_3CF_2CH_2OCOOCH_2CF_2CF_2H$, $C_3F_7OCF(CF_3)CH_2OCOOC_3H_7$, $HCF_2CF_2CH_2OCOOC_3H_7$, $(CF_3)_2CHOCOOCH_3$, and $CH_3OCOOCF_3$.

In particular, the fluorinated acyclic carbonate is preferably at least one selected from the group consisting of $(CF_3CH_2O)_2CO$, $(HCF_2CF_2CH_2O)_2CO$, $(CF_3CF_2CH_2O)_2CO$, $((CF_3)_2CHO)_2CO$, $(H(CF_2CF_2)_2CH_2O)_2CO$, $(C_3F_7OCF(CF_3)CF_2OCF(CF_3)CH_2O)_2CO$, $(C_3F_7OCF(CF_3)CH_2O)_2CO$, $CH_3OCOOCH_2CF_2CF_3$, $CH_3OCOOCH_2CF_2CF_2H$, $C_2H_5OCOOCH_2CF_2CF_2H$, $CH_3OCOOCH_2CF_3$, $C_2H_5OCOOCH_2CF_3$, $CF_3CF_2CH_2OCOOCH_2CF_2CF_2H$, $C_3F_7OCF(CF_3)CH_2OCOOC_3H_7$, $HCF_2CF_2CH_2OCOOC_3H_7$, $(CF_3)_2CHOCOOCH_3$, and $CH_3OCOOCF_3$. The fluorinated acyclic carbonate is particularly preferably at least one selected from the group consisting of $CH_3OCOOCH_2CF_3$ and $CH_3OCOOCH_2CF_2CF_2H$.

These fluorinated acyclic carbonates may be used alone or in combination of two or more at any ratio.

The amount of the fluorinated acyclic carbonate in 100% by volume of the nonaqueous solvent (I) is preferably 5% by volume or more, more preferably 10% by volume or more, still more preferably 15% by volume or more. Such a lower limit allows the electrolytic solution to have a viscosity within an appropriate range, restrains a reduction in ion conductivity, and allows electrochemical devices comprising the electrolytic solution to have large-current discharge characteristics within a favorable range. The amount of the fluorinated acyclic carbonate in 100% by volume of the nonaqueous solvent (I) is preferably 90% by volume or less, more preferably 85% by volume or less. Such an upper limit makes it possible to avoid a reduction in electric conductivity due to a reduction in permittivity of the electrolytic solution, and is likely to allow electrochemical devices comprising the electrolytic solution to have large-current discharge characteristics within a favorable range.

The nonaqueous solvent (I) may further comprise cyclic carboxylates, acyclic carboxylates, ether compounds, and other like compounds.

(Cyclic Carboxylate)

The cyclic carboxylate preferably has 3 to 12 carbon atoms.

Specific examples thereof include gamma-butyrolactone, gamma-valerolactone, gamma-caprolactone, and epsilon-caprolactone. Particularly preferred is gamma-butyrolactone because it can improve the battery characteristics owing to the improvement in degree of dissociation of lithium ions.

Cyclic carboxylates may be used alone or in combination of two or more at any ratio.

In general, the amount of the cyclic carboxylate is preferably 5% by volume or more, more preferably 10% by volume or more, in 100% by volume of the nonaqueous solvent. The cyclic carbonate in an amount within this range can improve the electric conductivity of the nonaqueous electrolytic solution, making it easy to improve the large-current discharge characteristics of electrochemical devices comprising the electrolytic solution. The amount of the cyclic carboxylate is also preferably 50% by volume or less, more preferably 40% by volume or less. Such an upper limit may allow the nonaqueous electrolytic solution to have a viscosity within an appropriate range, may make it possible to avoid a reduction in electric conductivity, may restrain an increase in resistance of the negative electrode, and may allow nonaqueous electrolytic solution secondary batteries to have large-current discharge characteristics within a favorable range.

(Acyclic Carboxylate)

The acyclic carboxylate is preferably a C3-C7 acyclic carboxylate. Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

Preferred are methyl acetate, ethyl acetate, n-propyl acetate, n-butyl acetate, methyl propionate, ethyl propionate, n-propyl propionate, isopropyl propionate, methyl butyrate, and ethyl butyrate, for example, in order to improve the ion conductivity owing to a reduction in viscosity.

Acyclic carboxylates may be used alone or in combination of two or more at any ratio.

In general, the amount of the acyclic carboxylate is preferably 10% by volume or more, more preferably 15% by volume or more, in 100% by volume of the nonaqueous solvent. Such a lower limit makes it easy to improve the electric conductivity of the electrolytic solution and improve the large-current discharge characteristics of electrochemical devices comprising the electrolytic solution. The amount of the acyclic carboxylate is also preferably 60% by volume or less, more preferably 50% by volume or less, in 100% by volume of the nonaqueous solvent. Such an upper limit makes it easy to restrain an increase in resistance of the negative electrode, and allow electrochemical devices comprising the electrolytic solution to have large-current discharge characteristics and cycle characteristics within favorable ranges.

(Ether Compound)

The ether compound is preferably a C3-C10 acyclic ether or a C3-C6 cyclic ether in which part of hydrogen atoms is replaced by a fluorine atom.

Examples of the C3-C10 acyclic ether include diethyl ether, di(2-fluoroethyl) ether, di(2,2-difluoroethyl) ether, di(2,2,2-trifluoroethyl) ether, ethyl(2-fluoroethyl) ether, ethyl(2,2,2-trifluoroethyl) ether, ethyl(1,1,2,2-tetrafluoroethyl) ether, (2-fluoroethyl)(2,2,2-trifluoroethyl) ether, (2-fluoroethyl)(1,1,2,2-tetrafluoroethyl) ether, (2,2,2-trifluoroethyl)(1,1,2,2-tetrafluoroethyl) ether, ethyl-n-propyl ether, ethyl(3-fluoro-n-propyl) ether, ethyl(3,3,3-trifluoro-n-propyl) ether, ethyl(2,2,3,3-tetrafluoro-n-propyl) ether, ethyl(2,2,3,3,3-pentafluoro-n-propyl) ether, 2-fluoroethyl-n-propyl ether, (2-fluoroethyl)(3-fluoro-n-propyl) ether, (2-fluoroethyl)(3,3,3-trifluoro-n-propyl) ether, (2-fluoroethyl)(2,2,3,3-tetrafluoro-n-propyl) ether, (2-fluoroethyl)(2,2,3,3,3-pentafluoro-n-propyl) ether, 2,2,2-trifluoroethyl-n-propyl ether, (2,2,2-trifluoroethyl)(3-fluoro-n-propyl) ether, (2,2,2-trifluoroethyl)(3,3,3-trifluoro-n-propyl) ether, (2,2,2-trifluoroethyl)(2,2,3,3-tetrafluoro-n-propyl) ether, (2,2,2-trifluoroethyl)(2,2,3,3,3-pentafluoro-n-propyl) ether, 1,1,2,2-tetrafluoroethyl-n-propyl ether, (1,1,2,2-tetrafluoroethyl)(3-fluoro-n-propyl) ether, (1,1,2,2-tetrafluoroethyl)(3,3,3-trifluoro-n-propyl) ether, (1,1,2,2-tetrafluoroethyl)(2,2,3,3-tetrafluoro-n-propyl) ether, (1,1,2,2-tetrafluoroethyl)(2,2,3,3,3-pentafluoro-n-propyl) ether, di-n-propyl ether, (n-propyl)(3-fluoro-n-propyl) ether, (n-propyl)(3,3,3-trifluoro-n-propyl) ether, (n-propyl)(2,2,3,3-tetrafluoro-n-propyl) ether, (n-propyl) (2,2,3,3,3-pentafluoro-n-propyl) ether, di(3-fluoro-n-propyl) ether, (3-fluoro-n-propyl)(3,3,3-trifluoro-n-propyl) ether, (3-fluoro-n-propyl)(2,2,3,3-tetrafluoro-n-propyl) ether, (3-fluoro-n-propyl)(2,2,3,3,3-pentafluoro-n-propyl) ether, di(3,3,3-trifluoro-n-propyl) ether, (3,3,3-trifluoro-n-propyl)(2,2,3,3-tetrafluoro-n-propyl) ether, (3,3,3-trifluoro-n-propyl)(2,2,3,3,3-pentafluoro-n-propyl) ether, di(2,2,3,3-tetrafluoro-n-propyl) ether, (2,2,3,3-tetrafluoro-n-propyl)(2,2,3,3,3-pentafluoro-n-propyl) ether, di(2,2,3,3,3-pentafluoro-n-propyl) ether, di-n-butyl ether, dimethoxy methane, methoxy ethoxy methane, methoxy(2-fluoroethoxy)methane, methoxy(2,2,2-trifluoroethoxy)methane, methoxy(1,1,2,2-tetrafluoroethoxy) methane, diethoxy methane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy) methane, dimethoxy ethane, methoxy ethoxy ethane, methoxy(2-fluoroethoxy)ethane, methoxy(2,2,2-trifluoroethoxy)ethane, methoxy(1,1,2,2-tetrafluoroethoxy)ethane, diethoxy ethane, ethoxy(2-fluoroethoxy)ethane, ethoxy(2,2,2-trifluoroethoxy)ethane, ethoxy(1,1,2,2-tetrafluoroethoxy) ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Examples of the C3-C6 cyclic ether include tetrahydrofuran, 2-methyl tetrahydrofuran, 3-methyl tetrahydrofuran, 1,3-dioxane, 2-methyl-1,3-dioxane, 4-methyl-1,3-dioxane, and 1,4-dioxane, and fluorinated compounds thereof.

Preferred are dimethoxy methane, diethoxy methane, ethoxy methoxy methane, ethylene glycol di-n-propyl ether, ethylene glycol di-n-butyl ether, and diethylene glycol dimethyl ether because they have a high ability to solvate lithium ions and improve the ion dissociation. Particularly preferred are dimethoxy methane, diethoxy methane, and ethoxy methoxy methane because they have low viscosity and give high ion conductivity.

Ether compounds may be used alone or in combination of two or more at any ratio.

In general, the amount of the ether compound in 100% by volume of the nonaqueous solvent is preferably 5% by volume or more, more preferably 10% by volume or more, still more preferably 1.5% by volume or more, whereas it is preferably 70% by volume or less, more preferably 60% by volume or less, still more preferably 50% by volume or less.

The ether compound used in an amount within this range is likely to assure the effect of improving the ion conductivity owing to the improvement in degree of dissociation of lithium ions and a reduction in viscosity of the acyclic ether. The negative electrode active material which is a carbonaceous material may make it easy to avoid a reduction in capacity due to co-insertion of the acyclic ether with lithium ions.

The electrolytic solution of the present invention may further comprise an auxiliary agent in accordance with the purpose as appropriate.

Examples of the auxiliary agent include the following unsaturated cyclic carbonates having a fluorine atom, overcharge inhibitors, and other assistants.

(Unsaturated Cyclic Carbonate Having Fluorine Atom)

The unsaturated cyclic carbonate having a fluorine atom may also preferably be a cyclic carbonate having an unsaturated bond and a fluorine atom (hereinafter, also abbreviated as a "fluorinated unsaturated cyclic carbonate"). The number of fluorine atoms in the fluorinated unsaturated cyclic carbonate may be any number that is one or greater. The number of fluorine atoms is usually six or smaller, preferably four or smaller, most preferably one or two.

Examples of the fluorinated unsaturated cyclic carbonate include fluorinated vinylene carbonate derivatives and fluorinated ethylene carbonate derivatives substituted with a substituent having an aromatic ring or a carbon-carbon double bond.

Examples of the fluorinated vinylene carbonate derivatives include 4-fluorovinylene carbonate, 4-fluoro-5-methyl vinylene carbonate, 4-fluoro-5-phenyl vinylene carbonate, 4-allyl-5-fluorovinylene carbonate, and 4-fluoro-5-vinyl vinylene carbonate.

Examples of the fluorinated ethylene carbonate derivatives substituted with a substituent having an aromatic ring or a carbon-carbon double bond include 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, 4,5-difluoro-4,5-diallyl ethylene carbonate, 4-fluoro-4-phenyl ethylene carbonate, 4-fluoro-5-phenyl ethylene carbonate, 4,4-difluoro-5-phenyl ethylene carbonate, and 4,5-difluoro-4-phenyl ethylene carbonate.

For combination use with the compound (III) of the formula (1), the fluorinated unsaturated cyclic carbonate to be favorably used is preferably 4-fluorovinylene carbonate, 4-fluoro-5-methyl vinylene carbonate, 4-fluoro-5-vinyl vinylene carbonate, 4-allyl-5-fluorovinylene carbonate, 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, or 4,5-difluoro-4,5-diallyl ethylene carbonate because such a compound can form a stable interface-protecting film.

The fluorinated unsaturated cyclic carbonate may have any molecular weight that does not significantly impair the effects of the present invention. The molecular weight is preferably 50 or higher and 250 or lower. The fluorinated unsaturated cyclic carbonate having a molecular weight within this range is likely to assure the solubility in the electrolytic solution and to exert the effects of the present invention.

The fluorinated unsaturated cyclic carbonate can be produced by any known production method. The molecular weight is more preferably 100 or higher and more preferably 200 or lower.

Fluorinated unsaturated cyclic carbonates may be used alone or in combination of two or more at any ratio. The fluorinated unsaturated cyclic carbonate may be used in any amount that does not significantly impair the effects of the present invention. In general, the amount of the fluorinated unsaturated cyclic carbonate in 100% by mass of the electrolytic solution is preferably 0.01% by mass or more, more preferably 0.1% by mass or more, still more preferably 0.2% by mass or more, whereas it is preferably 5% by mass or less, more preferably 4% by mass or less, still more preferably 3% by mass or less. The fluorinated unsaturated cyclic carbonate in an amount within this range is likely to exert the effect of sufficiently improving the cycle characteristics of electrochemical devices comprising the electrolytic solution and to avoid a reduction in high-temperature storage characteristics, an increase in amount of gas generated, and a reduction in discharge capacity retention ratio.

(Overcharge Inhibitor)

The electrolytic solution of the present invention may comprise an overcharge inhibitor in order to effectively restrain bursting or ignition of a battery when an electrochemical device comprising the electrolytic solution is overcharged, for example.

Examples of the overcharge inhibitor include aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran; partially fluorinated aromatic compounds such as 2-fluorobiphenyl, o-cyclohexyl fluorobenzene, and p-cyclohexyl fluorobenzene; and fluoroanisole compounds such as 2,4-difluoroanisole, 2,5-difluoroanisole, 2,6-difluoroanisole, and 3,5-difluoroanisole. Preferred are aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran. These compounds may be used alone or in combination of two or more. In the case of combination use of two or more compounds, preferred is a combination of cyclohexyl benzene and t-butyl benzene or t-amyl benzene, or a combination of at least one oxygen-free aromatic compound selected from biphenyl, alkyl biphenyl, terphenyl, partially hydrogenated terphenyl, cyclohexyl benzene, t-butyl benzene, t-amyl benzene, and the like, and at least one oxygen-containing aromatic compound selected from diphenyl ether, dibenzofuran, and the like for good balance between overcharge inhibiting characteristics and high-temperature storage characteristics.

(Other Assistants)

The electrolytic solution of the present invention can comprise any known assistant. Examples of the assistant include carbonate compounds such as erythritan carbonate, spiro-bis-dimethylene carbonate, and, methoxy ethylmethyl carbonate; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds such as 2,4,8,10-tetraoxaspiro [5.5]undecane and 3,9-divinyl-2,4,8,10-tetraoxaspiro[5.5] undecane; sulfur-containing compounds such as ethylene sulfite, 1,3-propane sultone, 1-fluoro-1,3-propane sultone, 2-fluoro-1,3-propane sultone, 3-fluoro-1,3-propane sultone, 1-propene-1,3-sultone, 1-fluoro-1-propene-1,3-sultone, 2-fluoro-1-propene-1,3-sultone, 3-fluoro-1-propene-1,3-sultone, 1,4-butane sultone, 1-butene-1,4-sultone, 3-butene-1,4-sultone, methyl fluorosulfonate, ethyl fluorosulfonate, methyl methanesulfonate, ethyl methanesulfonate, busulfan, sulfolene, diphenyl sulfone, N,N-dimethyl methanesulfonamide, N,N-diethyl methanesulfonamide, methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate, and 1,2-bis (vinylsulfonyloxy)ethane; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; phosphorus-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide, and triethylphosphine oxide; hydrocarbon compounds such as heptane, octane, nonane, decane, and cycloheptane; and fluoroaromatic compounds such as fluorobenzene, difluorobenzene, hexafluorobenzene, and benzotrifluoride. These compounds may be used alone or in combination of two or more. These assistants can improve the capacity retention characteristics and the cycle characteristics after high-temperature storage.

The assistant can be used in any amount that does not significantly impair the effects of the present invention. The amount of the assistant in 100% by mass of the electrolytic solution is preferably 0.01% by mass or more and 5% by mass or less. The assistant used in an amount within this range can sufficiently exert the effects thereof and is likely to avoid the deterioration in battery characteristics such as high-load discharge characteristics. The amount of the assistant is more preferably 0.1% by mass or more, still more preferably 0.2% by mass or more, whereas it is more preferably 3% by mass or less, still more preferably 1% by mass or less.

The electrolytic solution of the present invention comprises an electrolyte salt (II).

The electrolyte salt (II) can be any electrolyte salt, and it is preferably a lithium salt.

Any lithium salt that is known to be usable for electrolytic solutions for batteries can be used. Specific examples thereof include the following.

Examples of the lithium salt include: inorganic lithium salts such as $LiPF_6$, $LiBF_4$, $LiClO_4$, $LiAlF_4$, $LiSbF_6$, $LiTaF_6$, and $LiWF_7$;

lithium tungstates such as $LiWOF_5$;

lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

lithium sulfonates such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$;

lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoro ethane disulfonyl imide, lithium cyclic 1,3-perfluoropropane disulfonyl imide, and $LiN(CF_3SO_2)(C_4F_9SO_2)$;

lithium methide salts such as $LiC(FSO_2)_3$, $LiC(CF_3SO_2)_3$, and $LiC(C_2F_5SO_2)_3$;

lithium oxalatoborates such as lithium difluorooxalatoborate and lithium bis(oxalato)borate; lithium oxalatophosphates such as lithium tetrafluorooxalatophosphate, lithium difluorobis(oxalato)phosphate, and lithium tris(oxalato)phosphate; and fluoroorganic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$.

Particularly preferred are $LiPF_6$, $LiBF_4$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$ because they have an effect of improving the output characteristics, high rate charge and discharge characteristics, high-temperature storage characteristics, cycle characteristics, and other characteristics.

These lithium salts can be used alone or in combination of two or more. Preferable examples of a combination of two or more salts include a combination of $LiPF_6$ and $LiBF_4$ and a combination of $LiPF_6$ and $FSO_3Li$. Such combinations have an effect of improving the load characteristics and the cycle characteristics.

In this case, $LiBF_4$ or $FSO_3Li$ may be used at any concentration that does not significantly impair the effects of the present invention in 100% by mass of the whole electrolytic solution. The concentration in the electrolytic solution of the present invention is usually 0.01% by mass or more, preferably 0.1% by mass or more, whereas it is usually 30% by mass or less, preferably 20% by mass or less.

Alternatively, an inorganic lithium salt and an organic lithium salt may be used in combination, for example. Combination use of these salts has an effect of restraining the deterioration during high-temperature storage. Preferable examples of the organic lithium salt include $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$. In this case, the proportion of the organic lithium salt in 100% by mass of the whole electrolytic solution is preferably 0.1% by mass or more, particularly preferably 0.5% by mass or more, whereas it is preferably 30% by mass or less, particularly preferably 20% by mass or less.

The concentration of the lithium salt in the electrolytic solution can be any value that does not deteriorate the effects of the present invention. In order to allow the electrolytic solution to have an electric conductivity within a favorable range and to assure good battery performance, the total mole concentration of lithium in the electrolytic solution is preferably 0.3 mol/L or higher, more preferably 0.4 mol/L or higher, still more preferably 0.5 mol/L or higher, whereas it is preferably 3 mol/L or lower, more preferably 2.5 mol/L or lower, still more preferably 2.0 mol/L or lower.

Too low a total mole concentration of lithium may cause insufficient electric conductivity of the electrolytic solution. Too high a total mole concentration thereof may increase the viscosity and thus deteriorate the electric conductivity, deteriorating the battery performance.

The electrolytic solution of the present invention can be produced by a known method, such as dissolving the compound (III) represented by the formula (1) and the electrolyte salt (II) in the nonaqueous solvent (I).

Since the electrolytic solution of the present invention restrains gas generation and has stable battery characteristics, it is suitable as an electrolytic solution for electrochemical devices which are nonaqueous electrolytic batteries.

An electrochemical device comprising the electrolytic solution of the present invention is also one aspect of the present invention.

Examples of the electrochemical device include lithium ion secondary batteries, capacitors (electrolytic double-layer capacitors), radical batteries, solar cells (in particular, dye-sensitized solar cells), fuel cells, various electrochemical sensors, electrochromic elements, electrochemical switching elements, aluminum electrolytic capacitors, and tantalum electrolytic capacitors. Preferred are lithium ion secondary batteries and electrolytic double-layer capacitors, and particularly preferred are lithium ion secondary batteries.

A lithium ion secondary battery comprising the electrolytic solution of the present invention is also one aspect of the present invention.

The following will describe an electrochemical device comprising the electrolytic solution of the present invention.

The electrochemical device can have a known structure. It typically comprises negative and positive electrodes which can occlude and release ions (e.g., lithium ions), and the aforementioned electrolytic solution of the present invention.

<Negative Electrode>

First described is a negative electrode active material used for negative electrodes. The negative electrode active material may be any material which can electrochemically occlude and release lithium ions. Specific examples thereof include carbonaceous materials, alloyed materials, and lithium-containing metal complex oxide materials. These materials may be used alone or in combination of two or more.

(Negative Electrode Active Material)

Examples of the negative electrode active material include carbonaceous materials, alloyed materials, and lithium-containing metal complex oxide materials.

In order to achieve good balance of initial irreversible capacity and high-current-density charge and discharge characteristics, the carbonaceous material to be used as a negative electrode active material is preferably selected from:

(1) natural graphite;
(2) carbonaceous materials prepared by heat-treating an artificial carbonaceous substance or an artificial graphite substance at 400° C. to 3200° C. once or more;
(3) carbonaceous materials whose negative electrode active material layer comprises at least two carbonaceous substances having different crystallinities and/or has an interface at which the carbonaceous substances having different crystalinities are in contact with each other; and
(4) carbonaceous materials whose negative electrode active material layer comprises at least two carbonaceous materials having different orientations and/or has an interface at which the carbonaceous substances having different orientations are in contact with each other. The carbonaceous materials (1) to (4) may be used alone or in combination of two or more at any ratio.

Examples of the artificial carbonaceous substances and the artificial graphite substances in the materials (2) include: materials prepared by coating the surface of natural graphite with coal-based coke, petroleum-based coke, coal-based pitch, petroleum-based pitch, or the like and then heat-treating the resulting substance; natural graphite, coal-based coke, petroleum-based coke, coal-based pitch, petroleum-based pitch, needle coke, pitch coke and carbon materials prepared by partially or totally graphitizing these substances; pyrolysates of organic matter such as furnace black, acetylene black, and pitch-based carbon fibers; carbonizable organic matter and carbides thereof; and solutions prepared by dissolving carbonizable organic matter in a low-molecular-weight organic solvent such as benzene, toluene, xylene, quinoline, or n-hexane, and carbides thereof.

The alloyed material to be used as a negative electrode active material may be any compound that can occlude and release lithium, and examples thereof include simple lithium, simple metals and alloys that constitute lithium alloys, and oxides, carbides, nitrides, silicides, sulfides, and phosphides thereof. The simple metals and alloys constituting lithium alloys are preferably materials containing any of metal and semi-metal elements in the Groups 13 and 14 (i.e., excluding carbon), and more preferably simple metal of aluminum, silicon, and tin (hereinafter, also abbreviated as "specific metal elements"), and alloys and compounds containing any of these atoms. These materials may be used alone or in combination of two or more at any ratio.

Examples of the negative electrode active material having at least one atom selected from the specific metal elements include simple metal of any one specific metal element, alloys of two or more specific metal elements, alloys of one or two or more specific metal elements and one or two or more other metal elements, compounds containing one or two or more specific metal elements, and complex compounds such as oxides, carbides, nitrides, silicides, sulfides, and phosphides of the compounds. Use of such a simple metal, alloy, or metal compound as a negative electrode active material can give a high capacity to batteries.

Further, compounds can be used in which the above complex compounds are complexly bonded with several elements such as simple metals, alloys, and nonmetal elements. Specifically, in the case of silicon or tin, for example, an alloy of this element and a metal that does not serve as a negative electrode can be used. In the case of tin, for example, a complex compound comprising a combination of 5 or 6 elements including tin, a metal that serves as a negative electrode (excluding silicon), a metal that does not serve as a negative electrode, and a nonmetal element can be used.

In order to achieve a high capacity per unit mass of batteries, preferred among these negative electrode active materials are simple metals of the respective specific metal elements, alloys of two or more specific metal elements, and oxides, carbides, and nitrides of the specific metal elements. For a good capacity per unit mass and low environmental burden, simple metals of silicon and/or tin, alloys thereof, and oxides, carbides, and nitrides thereof are particularly preferred.

The lithium-containing metal complex oxide material to be used as a negative electrode active material can be any material that can occlude and release lithium. In order to achieve good high-current-density charge and discharge characteristics, materials containing titanium and lithium are preferred, lithium-containing composite metal oxide materials containing titanium are more preferred, and complex oxides of lithium and titanium (hereinafter, also abbreviated as "lithium titanium complex oxides") are still more preferred. In other words, use of a spinel-structured lithium titanium complex oxide contained in a negative electrode active material for electrochemical devices is particularly preferred because such a compound markedly reduces the output resistance.

Also preferred are lithium titanium complex oxides in which lithium or titanium is replaced by another metal element, for example at least one element selected from the group consisting of Na, K, Co, Al, Fe, Ti, Mg, Cr, Ga, Cu, Zn, and Nb.

In order to achieve a stable structure during doping and dedoping of lithium ions, the metal oxide is preferably a lithium titanium complex oxide represented by the formula (D) wherein $0.7 \leq x \leq 1.5$, $1.5 \leq y \leq 2.3$, $0 \leq z \leq 1.6$.

$$Li_xTi_yM_zO_4 \tag{D}$$

In the formula (D), M represents at least one element selected from the group consisting of Na, K, Co, Al, Fe, Ti, Mg, Cr, Ga, Cu, Zn, and Nb.

Particularly preferred compositions represented by the formula (D) are those satisfying one of the following:
(a) $1.2 \leq x \leq 1.4$, $1.5 \leq y \leq 1.7$, $z=0$
(b) $0.9 \leq x \leq 1.1$, $1.9 \leq y \leq 2.1$, $z=0$
(c) $0.7 \leq x \leq 0.9$, $2.1 \leq y \leq 2.3$, $z=0$
because these compositions give good balance of the battery performance.

Particularly preferred representative compositions of the compound are $Li_{4/3}Ti_{5/3}O_4$ corresponding to the composition (a), $Li_1Ti_2O_4$ corresponding to the composition (b), and $Li_{4/5}Ti_{11/5}O_4$ corresponding to the composition (c).

Preferable examples of the structure satisfying $Z \neq 0$ include $Li_{4/3}Ti_{4/3}Al_{1/3}O_4$.

<Structure and Production Method of Negative Electrode>

The electrode can be produced by any known method that does not significantly impair the effects of the present invention. For example, a binder (binding agent) and a solvent, and additives such as a thickening agent, a conductive material, and filler, if necessary, are added to the negative electrode active material to form slurry. This slurry is applied to a current collector, and then dried and pressed to provide an electrode.

With an alloyed material, a thin film layer containing the above negative electrode active material (negative electrode active material layer) can be produced by vapor deposition, sputtering, plating, or the like technique.

(Binding Agent)

The binder for binding the negative electrode active material can be any material stable to an electrolytic solution or a solvent to be used in production of the electrode.

Specific examples thereof include resin polymers such as polyethylene, polypropylene, polyethylene terephthalate, polymethyl methacrylate, aromatic polyamide, polyimide, cellulose, and nitro cellulose; rubbery polymers such as styrene-butadiene rubber (SBR), isoprene rubber, butadiene rubber, fluororubber, acrylonitrile-butadiene rubber (NBR), and ethylene-propylene rubber; styrene-butadiene-styrene block copolymers and hydrogenated products thereof; thermoplastic elastomeric polymers such as ethylene-propylene-diene terpolymers (EPDM), styrene-ethylene-butadiene-styrene copolymers, styrene-isoprene-styrene block copolymers, and hydrogenated products thereof; soft resin polymers such as syndiotactic-1,2-polybutadiene, polyvinyl acetate, ethylene-vinyl acetate copolymers, and propylene.α-olefin copolymers; fluoropolymers such as polyvinylidene fluoride, polytetrafluoroethylene, fluorinated polyvinylidene fluoride, and tetrafluoroethylene-ethylene copolymers; and polymer compositions having ion conductivity of alkali metal ions (especially, lithium ions). These may be used alone or in combination of two or more at any ratio.

The proportion of the binder based on the negative electrode active material is preferably 0.1% by mass or more, more preferably 0.5% by mass or more, and particularly preferably 0.6% by mass or more. The proportion is also preferably 20% by mass or less, more preferably 15% by mass or less, still more preferably 10% by mass or less, and particularly preferably 8% by mass or less. If the proportion of the binder based on the negative electrode active material exceeds the above range, a large amount of the binder fails to contribute to the battery capacity, so that the battery capacity may decrease. If the proportion is lower than the above range, the negative electrode may have a lowered strength.

In particular, in the case of using a rubbery polymer typified by SBR as a main component, the proportion of the binder based on the negative electrode active material is usually 0.1% by mass or more, preferably 0.5% by mass or more, more preferably 0.6% by mass or more, whereas the proportion thereof is usually 5% by mass or less, preferably 3% by mass or less, more preferably 2% by mass or less. In the case of using a fluoropolymer typified by polyvinylidene fluoride as a main component, the proportion of the binder based on the negative electrode active material is usually 1% by mass or more, preferably 2% by mass or more, and more preferably 3% by mass or more, whereas the proportion thereof is usually 15% by mass or less, preferably 10% by mass or less, and more preferably 8% by mass or less.

(Slurry-Forming Solvent)

The solvent for forming slurry may be any solvent that can dissolve or disperse the negative electrode active material and the binder, and a thickening agent and a conductive material that are used as necessary. The slurry-forming solvent may be an aqueous solvent or an organic solvent.

Examples of the aqueous solvent include water and alcohols. Examples of the organic solvent include N-methylpyrrolidone (NMP), dimethyl formamide, dimethyl acetamide, methyl ethyl ketone, cyclohexanone, methyl acetate, methyl acrylate, diethyl triamine, N,N-dimethyl aminopropyl amine, tetrahydrofuran (THF), toluene, acetone, diethyl ether, dimethyl acetamide, hexamethyl phospharamide, dimethyl sulfoxide, benzene, xylene, quinoline, pyridine, methyl naphthalene, and hexane.

Especially, in the case of an aqueous solvent, preferably, additives such as a dispersant are used in combination with a thickening agent, and slurry is formed using latex such as SBR. These solvents may be used alone or in combination of two or more at any ratio.

(Current Collector)

The current collector for supporting the negative electrode active material can be any known one. Examples of the current collector for negative electrodes include metal materials such as aluminum, copper, nickel, stainless steel, and nickel-plated steel. Copper is preferred in terms of easy processability and cost.

For current collectors made of metal material, the form thereof may be, for example, a metal foil, a metal cylinder, a metal coil, a metal plate, a metal film, expanded metal, punched metal, or a metal foam. The form of the current collector is preferably a metal film, more preferably a copper foil. It is still more preferably a rolled copper foil formed by a rolling technique or an electro-deposited copper foil formed by electrolysis. Both of these foils can be used as a current collector.

The current collector usually has a thickness of 1 μm or larger, preferably 5 μm or larger. The thickness is also usually 100 μm or smaller, preferably 50 μm or smaller. Too thick a negative electrode current collector may cause an excessive reduction in capacity of the whole battery, whereas too thin a current collector may be difficult to handle.

(Ratio Between Thicknesses of Current Collector and Negative Electrode Active Material Layer)

The ratio between the thicknesses of the current collector and the negative electrode active material layer may be any value, and the ratio "(thickness of negative electrode active material layer on one side immediately before injection of electrolytic solution)/(thickness of current collector)" is preferably 150 or lower, more preferably 20 or lower, particularly preferably 10 or lower, whereas the ratio is preferably 0.1 or higher, more preferably 0.4 or higher, particularly preferably 1 or higher. If the ratio between the thicknesses of the current collector and the negative electrode active material layer exceeds the above range, the current collector may generate heat due to Joule heating during high-current-density charging and discharging. If the ratio is below the above range, the ratio by volume of the current collector to the negative electrode active material is so high that the capacity of the battery may decrease.

<Positive Electrode>
(Positive Electrode Active Material)

The following will describe a positive electrode active material to be used for positive electrodes. The positive electrode active material used in the present invention is preferably a lithium transition metal compound powder that satisfies one of the following requirements and that can intercalate and release lithium ions.

1. Lithium transition metal compound powder with a pH of 10.8 or higher.
2. Lithium transition metal compound powder that comprises: a compound containing at least one element selected from the group consisting of Mo, W, Nb, Ta, and Re; and a compound containing one or both of B and Bi elements.
3. Lithium transition metal compound powder having a peak within the range of a pore radius range of not smaller than 80 nm but smaller than 800 nm.

(Lithium Transition Metal Compound)

The lithium transition metal compound is a compound having a structure that enables intercalation and release of Li ions, and examples thereof include sulfides, phosphate compounds, and lithium transition metal complex oxides. Examples of the sulfides include compounds having a two-dimensional lamellar structure such as $TiS_2$ and $MoS_2$ and chevrel compounds having a firm three-dimensional skeleton structure represented by the formula $Me_xMo_6S_8$ (wherein Me represents a transition metal typified by Pb, Ag, and Cu). Examples of the phosphate compound include those having an olivine structure generally represented by $LiMePO_4$ (wherein Me represents at least one transition metal). Specific examples thereof include $LiFePO_4$, $LiCoPO_4$, $LiNiPO_4$, and $LiMnPO_4$. Examples of the lithium transition metal complex oxide include those having a spinel structure which enable 3D diffusion and those having a layered structure which enable 2D diffusion of lithium ions. Those having a spinel structure are generally represented by $LiMe_2O_4$ (wherein Me represents at least one transition metal). Specific examples thereof include $LiMn_2O_4$, $LiCoMnO_4$, $LiNi_{0.5}Mn_{1.5}O_4$, and $LiCoVO_4$. Those having a layered structure are generally represented by $LiMeO_2$ (wherein Me represents at least one transition metal). Specific examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

Preferred are lithium nickel manganese cobalt complex oxides and $LiCoO_2$.

In order to achieve good lithium ion diffusion, the lithium transition metal compound powder is preferably one having an olivine structure, a spinel structure, or a layered structure. Particularly preferred is one having a layered structure.

The lithium transition metal compound powder may further include any different element. Such a different element comprises at least one selected from the group consisting of B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, and I. These different elements may be incorporated into the crystal structure of the lithium nickel manganese cobalt complex oxide, or may not be incorporated into the crystal structure of the lithium nickel manganese cobalt complex oxide but be present unevenly as a simple substance or a compound on the surface of particles or the grain boundary.

(Additive)

The present invention may further use a compound (hereinafter, also referred to as an "additive 1") comprising at least one element selected from the group consisting of Mo, W, Nb, Ta, and Re (hereinafter, also referred to as an "additive element 1") and a compound (hereinafter, also referred to as an "additive 2") comprising at least one element selected from the group consisting of B and Bi (hereinafter, also referred to as an "additive element 2").

In order to achieve good effects, the additive element 1 is preferably Mo or W, most preferably W. The additive element 2 is preferably B because it is available at low cost as an industrial material and it is a light element.

The compound (additive 1) comprising the additive element 1 can be in any form that allows the present invention to exert the effects thereof. It is usually an oxide. Exemplary compounds of the additive 1 include MoO, $MoO_2$, $MoO_3$, $MoO_x$, $Mo_2O_3$, $Mo_2O_5$, $Li_2MoO_4$, WO, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, NbO, $NbO_2$, $Nb_2O_3$, $Nb_2O_5$, $Nb_2O_5 \cdot nH_2O$, $LiNbO_3$, $Ta_2O$, $Ta_2O_5$, $LiTaO_3$, $ReO_2$, $ReO_3$, $Re_2O_3$, and $Re_2O_7$. For example, $MoO_3$, $Li_2MoO_4$, $WO_3$, and $Li_2WO_4$ are preferred, and $WO_3$ is particularly preferred, because they are relatively easily available industrial materials or they contain lithium. These additives 1 may be used alone or in combination of two or more.

The compound (additive 2) comprising the additive element 2 can be any compound that allows the present invention to exert the effects thereof. It is usually boric acid or a salt with an oxoacid, an oxide, or a hydroxide. Preferred among these additives 2 are boric acid and oxides because they are available at low cost as industrial materials, and particularly preferred is boric acid.

Exemplary compounds of the additive 2 include BO, $B_2O_2$, $B_2O_3$, $B_4O_5$, $B_6O$, $B_7O$, $B_{13}O_2$, $LiBO_2$, $LiB_5O_8$, $Li_2B_4O_7$, $HBO_2$, $H_3BO_3$, $B(OH)_3$, $B(OH)_4$, $BiBO_3$, $Bi_2O_3$, $Bi_2O_5$, and $Bi(OH)_3$. Preferred are $B_2O_3$, $H_3BO_3$, and $Bi_2O_3$, and particularly preferred is $H_3BO_3$ because they are easily available as industrial materials at relatively low cost. These additives 2 may be used alone or in combination of two or more.

The sum of the amounts of the additive 1 and the additive 2 based on the total mole of the transition metal elements constituting the main components is usually 0.1 mol % or more, preferably 0.3 mol % or more, more preferably 0.5 mol % or more, particularly preferably 1.0 mol % or more, whereas it is usually less than 8 mol %, preferably 5 mol % or less, more preferably 4 mol % or less, particularly preferably 3 mol % or less. Less than the lower limit of the sum of the amounts of the additives 1 and 2 may possibly fail to give the above effects, whereas more than the upper limit thereof may possibly deteriorate the battery performance.

(Production Method of Positive Electrode Active Material)

The positive electrode active material can be produced by any usual method of producing inorganic compounds. In particular, a spherical or ellipsoidal active material can be produced by various methods. For example, a material substance of transition metal is dissolved or crushed and dispersed in a solvent such as water, and the pH of the solution or dispersion is adjusted under stirring to form a spherical precursor. The precursor is recovered and, if necessary, dried. Then, a Li source such as LiOH, $Li_2CO_3$, or $LiNO_3$ is added thereto and the mixture is fired at high temperature, thereby providing an active material.

In order to produce a positive electrode, the aforementioned positive electrode active materials may be used alone or in any combination with one or more materials having a different composition at any ratio. Preferable examples of the combination in this case include combinations with $LiCoO_2$ and $LiMn_2O_4$ (e.g., $LiNi_{0.33}Co_{0.33}Mn_{0.33}O_2$) in which part of Mn may optionally be replaced by a different transition metal, and combinations with $LiCoO_2$ in which part of Co may optionally be replaced by a different transition metal.

(Production Method of Lithium Transition Metal Compound Powder)

The lithium transition metal compound powder can be produced by any non-specific method. For example, the powder is favorably produced by a method comprising: preparing slurry by pulverizing a lithium compound, a transition metal compound of at least one selected from Mn, Co, and Ni, and the aforementioned additives in a liquid medium and uniformly dispersing the components therein; spray-drying the resulting slurry; and sintering the resulting spray-dried matter.

In the case of lithium nickel manganese cobalt complex oxide powder, for example, the powder can be produced by dispersing a lithium compound, a nickel compound, a manganese compound, a cobalt compound, and the additives in a liquid medium to prepare slurry, spray-drying the slurry, and sintering the resulting spray-dried matter in an oxygen-containing gas atmosphere.

The following will describe the method of producing a lithium transition metal compound powder to be used in the present invention with reference to an exemplary method of producing a lithium nickel manganese cobalt complex oxide powder, which is one preferable embodiment of the present invention.

I) Slurry Preparation

With respect to the material compounds to be used in preparing slurry for production of the lithium transition metal compound powder, examples of the lithium compound include $Li_2CO_3$, $LiNO_3$, $LiNO_2$, $LiOH$, $LiCH.H_2O$, $LiH$, $LiF$, $LiCl$, $LiBr$, $LiI$, $CH_3OOLi$, $Li_2O$, $Li_2SO_4$, Li dicarboxylates, Li citrate, fatty acid Li, and alkyl lithium. Preferred among these are lithium compounds free from nitrogen atoms, sulfur atoms, and halogen atoms because they generate no hazardous materials such as $SO_X$ and $NO_X$ during sintering and make it easy to form voids in the secondary particles of the spray-dried powder by, for example, generating decomposing gas during sintering. In consideration of these requirements, $Li_2CO_3$, $LiOH$, and $LiOH.H_2O$ are preferred, and $Li_2CO_3$ is particularly preferred. These lithium compounds may be used alone or in combination of two or more.

Examples of the nickel compound include $Ni(OH)_2$, $NiO$, $NiOOH$, $NiCO_3$, $2NiCO_3.3Ni(OH)_2.4H_2O$, $NiC_2O_4.2H_2O$, $Ni(NO_3)_2.6H_2O$, $NiSO_4$, $NiSO_4.6H_2O$, fatty acid nickel, and nickel halides. Preferred among these nickel compounds are $Ni(OH)_2$, $NiO$, $NiOOH$, $NiCO_3$, $2NiCO_3.3Ni(OH)_2.4H_2O$, and $NiC_2O_4.2H_2O$ because they generate no hazardous materials such as $SO_X$ and $NO_X$ during sintering. More preferred are $Ni(OH)_2$, $NiO$, $NiOOH$, and $NiCO_3$ because they are available at low cost as industrial materials and have high reactivity. Particularly preferred are $Ni(OH)_2$, $NiOOH$, and $NiCO_3$ because they are likely to form voids in the secondary particles of the spray-dried powder by, for example, generating decomposing gas during sintering. These nickel compounds may be used alone or in combination of two or more.

Examples of the manganese compound include manganese oxides such as $Mn_2O_3$, $MnO_2$, and $Mn_3O_4$, manganese salts such as $MnCO_3$, $Mn(NO_3)_2$, $MnSO_4$, manganese acetate, manganese dicarboxylates, manganese citrate, and fatty acid manganese, oxyhydroxides, and halides such as manganese chloride. Preferred among these manganese compounds are $MnO_2$, $Mn_2O_3$, $Mn_3O_4$, and $MnCO_3$ because they generate no gas such as $SO_X$ and $NO_X$ during sintering, and are available at low cost as industrial materials. These manganese compounds may be used alone or in combination of two or more.

Examples of the cobalt compound include $Co(OH)_2$, $CoOOH$, $CoO$, $Co_2O_3$, $Co_3O_4$, $Co(OCOCH_3)_2.4H_2$, $CoCl_2$, $Co(NO_3)_2.6H_2O$, $Co(SO_4)_2.7H_2O$, and $CoCO_3$. Preferred are $Co(OH)_2$, $CoOOH$, $CoO$, $Co_2O_3$, $Co_3O_4$, and $CoCO_3$ because they generate no hazardous materials such as $SO_X$ and $NO_X$ during sintering. Still more preferred are $Co(OH)_2$ and $CoOOH$ because they are available at low cost and have high reactivity. Particularly preferred are $Co(OH)_2$, $CoOOH$, and $CoCO_3$ because they are likely to form voids in the secondary particles of the spray-dried powder by, for example, generating decomposing gas during sintering. These cobalt compounds may be used alone or in combination of two or more.

In addition to the above Li, Ni, Mn, and Co material compounds, any of the aforementioned different elements can be introduced by element substitution, or a group of compounds for efficient formation of voids in the secondary particles to be formed by spray-drying can be used. Such compounds for efficient formation of voids in the secondary particles can be added before or after mixing the materials in accordance with the properties of the compounds. In particular, compounds which are easily decomposed by a mechanical shearing force during the mixing are preferably added after the mixing. The additives are as mentioned above.

The materials may be mixed by any method, such as wet mixing or dry mixing. Examples of the method include those using a device such as a ball mill, a vibrating mill, or a bead mill. Preferred is a wet mixing in which material compounds are mixed in a liquid medium such as water or an alcohol because the materials are more uniformly mixed and the mixture can have higher reactivity during the sintering.

The mixing time depends on the mixing method. The mixing only needs to continue for a period of time that allows the materials to be uniformly mixed at the level of particles. For example, the mixing time with a ball mill (wet or dry) is usually about 1 hour to 2 days, and the residence time with a bead mill (wet process) is usually about 0.1 to 6 hours.

The mixing of the materials is preferably in parallel with pulverization of the materials. The index of the degree of pulverization is a particle size of pulverized material particles, and the average particle size (median size) used as an index is usually 0.6 μm or smaller, preferably 0.55 μm or smaller, still more preferably 0.52 μm or smaller, most preferably 0.5 μm or smaller. Pulverized material particles having too large an average particle size may cause a reduction in reactivity during the sintering, as well as difficulty in making the composition uniform. In contrast, pulverization of materials into particles smaller than necessary causes cost up. Thus, the materials only need to be pulverized into an average particle size of usually 0.01 μm or larger, preferably 0.02 μm or larger, more preferably 0.05 μm or larger. Such a degree of pulverization can be achieved by any method, but wet pulverization is preferred. Specific examples of the method include a method using DYNO-MILL.

The median size of the pulverized particles in slurry is measured using a known laser diffraction/scattering particle size distribution analyzer at a refractive index of 1.24, with the particle size reference being a volume reference. The dispersion medium used in the measurement is a 0.1% by weight aqueous solution of sodium hexametaphosphate. The measurement was performed after 5-minute ultrasonic dispersion (output: 30 W, frequency: 22.5 kHz).

II) Spray-Drying

The wet mixing is usually followed by drying. Drying may be performed by any method, and spray-drying is preferred in order to achieve good uniformity, powder fluidity, and powder handling performance of particulate substances to be generated, and efficient production of dried particles.

(Spray-Dried Powder)

In the method of producing a lithium transition metal compound powder (e.g., a lithium nickel manganese cobalt complex oxide powder), the material compounds and the additives are wet-pulverized to form slurry and this slurry is spray-dried, so that a powder of secondary particles which result from coagulation of primary particles is obtained. The characteristics relating to the shape of the spray-dried powder consisting of the secondary particles resulting from the coagulation of primary particles can be confirmed by, for example, SEM observation or cross-sectional SEM observation.

III) Firing

The spray-dried powder obtained in the above spray-drying is then subjected to sintering as a sintering precursor.

The sintering conditions depend on the composition and the lithium compound material to be used. Still, when the sintering temperature is too high, the primary particles tend to grow excessively, the sintering between particles tends to proceed excessively, and the specific surface area tends to be too small. In contrast, when a sintering temperature is too low, different phases may coexist, the crystal structure may not grow, and lattice strain may increase. Further, the specific surface area may be too large. The sintering temperature is usually 1000° C. or higher, preferably 1010° C. or higher, more preferably 1025° C. or higher, most preferably 1050° C. or higher, and preferably 1250° C. or lower, more preferably 1200° C. or lower, still more preferably 1175° C. or lower.

The sintering can be performed using a box furnace, a tube furnace, a tunnel furnace, or a rotary kiln, for example. The sintering is usually divided into three sections, i.e., temperature-increasing, maximum-temperature-holding, and temperature-decreasing sections. The number of performing the second section of holding the maximum temperature may not necessarily be only one, and the second section may be performed twice or more according to need. The cycle consisting of temperature increase, maximum temperature holding, and temperature decrease may be repeated twice or more. Between the cycles may exist disintegration of coagulated secondary particles to the extent that the particles are not broken or pulverization of the particles into primary particles or much finer particles.

In the case of two-stage sintering, the first stage is preferably maintained at a temperature which is not lower than the temperature where the Li material starts to decompose and not higher than the temperature where the material melts. For example, in the case of lithium carbonate, the holding temperature in the first stage is preferably 400° C. or higher, more preferably 450° C. or higher, still more preferably 500° C. or higher, most preferably 550° C. or higher, whereas the holding temperature is usually 950° C. or lower, more preferably 900° C. or lower, still more preferably 880° C. or lower, most preferably 850° C. or lower.

The temperature-increasing section toward the maximum-temperature-holding section usually increases the temperature in a furnace at a temperature-increasing rate of 1° C./min or higher and 20° C./min or lower. Too low a temperature-increasing rate takes much time, and thus is industrially disadvantageous, but too high a rate may fail to allow the furnace temperature to follow the set temperature. The temperature-increasing rate is preferably 2° C./min or higher, more preferably 3° C./min or higher, whereas the rate is preferably 18° C./min or lower, more preferably 15° C./min or lower.

The holding time in the maximum-temperature-holding section depends on the temperature. Still, within the above temperature range, the holding time is usually 15 minutes or longer, preferably 30 minutes or longer, still more preferably 45 minutes or longer, most preferably 1 hour or longer, whereas the holding time is usually 24 hours or shorter, preferably 12 hours or shorter, still more preferably 9 hours or shorter, most preferably 6 hours or shorter. Too short a sintering time makes it difficult to form a lithium transition metal compound powder with good crystallinity, whereas too long a sintering time is impractical. Too long a sintering time is disadvantageous because the process requires post-disintegration or has difficulty in disintegration.

The temperature-decreasing section usually decreases the temperature in a furnace at a temperature-decreasing rate of 0.1° C./min or higher and 20° C./min or lower. Too low a temperature-decreasing rate takes a long time so that it is industrially disadvantageous, whereas too high a temperature-decreasing rate also tends to give poor uniformity of the target product or to accelerate the deterioration of a container. The temperature-decreasing rate is preferably 1° C./min or higher, more preferably 3° C./min or higher, whereas it is preferably 15° C./min or lower.

The sintering atmosphere is an appropriate gas atmosphere that satisfies an oxygen partial pressure range appropriate for the composition of the target lithium transition metal compound powder. Examples of the gas include oxygen, air, nitrogen, argon, hydrogen, carbon dioxide, and gas mixtures thereof. For the lithium nickel manganese cobalt complex oxide powder, oxygen-containing gas atmosphere such as air can be used. The oxygen concentration is usually 1% by volume or more, preferably 10% by volume or more, more preferably 15% by volume or more, whereas it is usually 100% by volume or less, preferably 50% by volume or less, more preferably 25% by volume or less.

In production of a lithium transition metal compound powder (e.g., a lithium nickel manganese cobalt complex oxide powder having the above specific composition) by such a production method under certain producing conditions, the ratio by mole of Li/Ni/Mn/Co can be adjusted to the target value by adjusting the ratio of mixing the respective compounds when a lithium compound, a nickel compound, a manganese compound, and a cobalt compound, and the additives in the present invention are dispersed in a liquid medium to prepare slurry.

The lithium transition metal compound powder such as a lithium nickel manganese cobalt complex oxide powder produced as mentioned above can provide a positive electrode material for lithium secondary batteries having good balance of performance, such as high capacity, low-temperature output characteristics, and excellent storage characteristics.

<Structure and Production Method of Positive Electrode>

The following will describe the structure of a positive electrode. A positive electrode can be produced by forming, on a current collector, a positive electrode active material layer containing a positive electrode active material and a binding agent. The positive electrode comprising a positive electrode active material can be produced by a usual method. Specifically, a positive electrode active material and a binding agent, and if necessary other components such as a conductive material and a thickening agent are dry-mixed and formed into a sheet-shaped article, and this sheet is compression-bonded to a positive electrode current collector, or these materials are dissolved or dispersed in a liquid medium to prepare slurry, and this slurry is applied to a positive electrode current collector, and then dried so that a positive electrode active material layer is formed on the current collector. Thereby, a positive electrode can be produced.

The amount of the positive electrode active material in the positive electrode active material layer is preferably 80% by mass or more, more preferably 82% by mass or more, particularly preferably 84% by mass or more. The upper limit thereof is preferably 99% by mass or less, more preferably 98% by mass or less. Too small an amount of the positive electrode active material in the positive electrode active material layer may lead to an insufficient electric capacity. In contrast, too large an amount thereof may lead to an insufficient strength of the resulting positive electrode.

(Binding Agent)

The binding agent to be used in production of the positive electrode active material layer may be any binding agent. In the case of an application method, the binding agent only needs to be a material that can be dissolved or dispersed in a liquid medium to be used in production of the electrode. Specific examples thereof include the same binding agents mentioned above in the production of the negative electrode. These materials can be used alone or in combination of two or more at any ratio.

The proportion of the binding agent in the positive 1.5 electrode active material layer is usually 0.1% by mass or more, preferably 1% by mass or more, more preferably 1.5% by mass or more. The upper limit of the proportion is usually 80% by mass or less, preferably 60% by mass or less, more preferably 40% by mass or less, most preferably 10% by mass or less. Too low a proportion of the binding agent may fail to sufficiently hold the positive electrode active material so that the resulting positive electrode may have an insufficient mechanical strength, resulting in lower battery performance such as cycle characteristics. In contrast, too high a proportion thereof may lead to a reduction in battery capacity and conductivity.

(Slurry-Forming Solvent)

The solvent for forming slurry may be any solvent that can dissolve or disperse therein the positive electrode active material, the conductive material, and the binding agent, and a thickening agent used if necessary. The solvent may be either of an aqueous solvent or an organic solvent. Examples of the aqueous medium include water and solvent mixtures of an alcohol and water. Examples of the organic medium include aliphatic hydrocarbons such as hexane; aromatic hydrocarbons such as benzene, toluene, xylene, and methyl naphthalene; heterocycle compounds such as quinoline and pyridine; ketones such as acetone, methyl ethyl ketone, and cyclohexanone; esters such as methyl acetate and methyl acrylate; amines such as diethylene triamine and N,N-dimethylaminopropylamine; ethers such as diethyl ether, propylene oxide, and tetrahydrofuran (THF); amides such as N-methylpyrrolidone (NMP), dimethyl formamide, and dimethyl acetamide; and aprotic polar solvents such as hexamethyl phospharamide and dimethyl sulfoxide.

(Current Collector)

The positive electrode current collector may be formed from any known material. Specific examples thereof include metal materials such as aluminum, stainless steel, nickel-plated material, titanium, and tantalum; and carbon materials such as carbon cloth and carbon paper. Preferred are metal materials, especially aluminum.

In the case of a metal material, the current collector may be in the form of metal foil, metal cylinder, metal coil, metal plate, metal film, expanded metal, punched metal, metal foam, or the like. In the case of a carbon material, it may be in the form of carbon plate, carbon film, carbon cylinder, or the like.

In order to reduce the electric contact resistance between the current collector and the positive electrode active material layer, the current collector also preferably has a conductive auxiliary agent applied on the surface thereof. Examples of the conductive auxiliary agent include carbon and noble metals such as gold, platinum, and silver.

The ratio between the thicknesses of the current collector and the positive electrode active material layer may be any value, and the ratio {(thickness of positive electrode active material layer on one side immediately before injection of electrolytic solution)/(thickness of current collector)} is preferably 20 or lower, more preferably 15 or lower, most preferably 10 or lower. The lower limit of the ratio is preferably 0.5 or higher, more preferably 0.8 or higher, most preferably 1 or higher. If the ratio exceeds the above range, the current collector may generate heat due to Joule heating during high-current-density charging and discharging. If the ratio is below the above range, the ratio by volume of the current collector to the positive electrode active material is so high that the capacity of the battery may decrease.

<Separator>

In order to prevent short circuits, a separator is usually disposed between the positive electrode and the negative electrode. In this case, the electrolytic solution of the present invention is usually impregnated into this separator.

The separator may be formed from any material and may have any shape. The material and the shape thereof can be any known ones that do not significantly deteriorate the effects of the present invention. The separator is preferably in the form of a porous sheet or a nonwoven fabric which is formed from a material stable to the electrolytic solution of the present invention, such as resin, glass fiber, or inorganic matter, and which is excellent in liquid retention.

Examples of the material of a resin or glass-fiber separator include polyolefins such as polyethylene and polypropylene, aromatic polyamide, polytetrafluoroethylene, polyether sulfone, and glass filters. Preferred are glass filters and polyolefins, and more preferred are polyolefins. These materials may be used alone or in combination of two or more at any ratio.

The separator may have any thickness, and the thickness is usually 1 μm or larger, preferably 5 μm or larger, more preferably 8 μm or larger, whereas it is usually 50 μm or smaller, preferably 40 μm or smaller, more preferably 30 μm or smaller. A separator thinner than the above range may have reduced insulation and mechanical strength. A separator thicker than the above range may not only have lowered battery performance, such as rate characteristics, but also lead to a reduced energy density of the whole electrochemical device.

When the separator is a porous one such as a porous sheet or a nonwoven fabric, the separator may have any porosity. The porosity is usually 20% or higher, preferably 35% or higher, more preferably 45% or higher, whereas it is usually 90% or lower, preferably 85% or lower, more preferably 75% or lower. A porosity lower than the above range tends to cause an increase in film resistance, deteriorating the rate characteristics. A porosity higher than the above range tends to cause a decrease in mechanical strength of the separator, lowering the insulation.

The separator may also have any average pore size. The average pore size is usually 0.5 μm or smaller, preferably 0.2 μm or smaller, whereas the average pore size is usually 0.05 μm or larger. The separator having an average pore size exceeding the above range may easily cause short circuits. The separator having an average pore size lower than the above range may have a high film resistance, deteriorating the rate characteristics.

Examples of the inorganic material include oxides such as alumina and silicon dioxide, nitrides such as aluminum nitride and silicon nitride, and sulfates such as barium sulfate and calcium sulfate. The inorganic material is in the form of particles or fibers.

The separator is in the form of a thin film such as a nonwoven fabric, a woven fabric, or a microporous film. The thin film favorably has a pore diameter of 0.01 to 1 μm and a thickness of 5 to 50 μm. In addition to the form of the above separate thin film, the separator may have a structure in which a complex porous layer containing particles of the above inorganic material is formed on the surface of one or both of the positive and negative electrodes using a resin binding agent. For example, alumina particles having a 90% particle size of smaller than 1 μm is applied to the respective surfaces of the positive electrode with fluororesin used as a binding agent to form a porous layer.

The following will describe a battery design.

<Electrode Group>

The electrode group may be either a laminated structure comprising the above positive electrode plate and negative electrode plate with the above separator interposed therebetween, or a wound structure comprising the above positive electrode plate and negative electrode plate in spiral with the above separator interposed therebetween. The proportion of the volume of the electrode group in the battery internal volume (hereinafter, referred to as an electrode group proportion) is usually 40% or higher, preferably 50% or higher, whereas it is usually 90% or lower, preferably 80% or lower.

An electrode group proportion lower than the above range may lead to a low battery capacity. If the electrode group proportion exceeds the above range, the battery has small space for voids. Thus, when the battery temperature rises to high temperature, the components may swell or the liquid fraction of the electrolytic solution shows a high vapor pressure, so that the internal pressure rises. This may result in the deterioration in battery characteristics such as repeated charge and discharge performance and storageability at high temperatures, causing a gas-releasing valve for releasing the internal pressure toward the outside to work.

<Current Collecting Structure>

The current collecting structure may be any structure. In order to more effectively improve the high-current-density charge and discharge characteristics by the electrolytic solution of the present invention, the current collecting structure is preferably a structure which reduces the resistances at wiring portions and jointing portions. When the internal resistance is reduced in such a manner, the effects of using the electrolytic solution of the present invention can particularly favorably be achieved.

In an electrode group having the layered structure, the metal core portions of the respective electrode layers are preferably bundled and welded to a terminal. If an electrode has a large area, the internal resistance is high. Thus, multiple terminals may preferably be formed in the electrode to reduce the resistance. In an electrode group having the wound structure, multiple lead structures may be disposed on each of the positive electrode and the negative electrode and bundled to a terminal. Thereby, the internal resistance can be reduced.

<External Case>

The external case may be made of any material that is stable to an electrolytic solution to be used. Specific examples thereof include metals such as nickel-plated steel plates, stainless steel, aluminum and aluminum alloys, and magnesium alloys, and layered film (laminate film) of resin and aluminum foil. In order to reduce the weight, metals such as aluminum and aluminum alloys and laminate films are favorably used.

External cases made of metal may have a sealed up structure formed by welding the metal by laser welding, resistance welding, or ultrasonic welding or a caulking structure using the metal via a resin gasket. External cases made of a laminate film may have a sealed up structure formed by hot melting the resin layers. In order to improve the sealability, a resin which is different from the resin of the laminate film may be disposed between the resin layers. Especially, in the case of forming a sealed up structure by heat melting the resin layers via current collecting terminals, metal and resin are to be bonded. Thus, the resin to be disposed between the resin layers is favorably a resin having a polar group or a modified resin having a polar group introduced thereinto.

<Protective Element>

A protective element may be used such as a positive temperature coefficient (PTC) which increases the resistance when abnormal generation of heat or overcurrent is observed, a thermal fuse, a thermistor, or a valve (current-cutoff valve) that cuts off a current passing through the circuit when the internal pressure or internal temperature in the battery suddenly rises due to abnormal generation of heat. The protective element is preferably one that does not work under normal conditions at high current. More preferably, a battery is designed so as not to cause abnormal generation of heat or thermal runaway even without any protective element.

<External Housing>

The electrochemical device of the present invention usually comprises an external housing that accommodates the electrolytic solution, the negative electrode, the positive electrode, the separator, and other components. This external housing may be any known housing that does not significantly impair the effects of the present invention. Specifically, the external housing may be made of any material. The material is usually nickel-plated iron, stainless steel, aluminum or its alloy, nickel, titanium, or the like.

The external housing may have any shape, and may be in the form of a cylinder, a square, a laminate, a coin, or a large-size shape.

A module comprising the lithium ion secondary battery of the present invention is also one aspect of the present invention.

As mentioned hereinabove, the electrolytic solution of the present invention restrains gas generation and is excellent in battery characteristics. Thus, the electrolytic solution is particularly useful for electrochemical devices such as large-size lithium ion secondary batteries for hybrid cars and distributed power source systems, and also useful for electrochemical devices such as small-size lithium ion secondary batteries.

Examples and Comparative Example

The present invention will be described referring to, but not limited to, examples and comparative examples.

A 1-L PFA bottle was charged with solvents shown in Table 1 or 2 mixed at a volume ratio shown in Table 1 or 2. The solvent mixture was blended with a nonaqueous electrolyte salt shown in Table 1 or 2 at a weight ratio shown in Table 1 or 2 to give an electrolytic solution. To the obtained electrolytic solution were added additives such as a acyclic sulfonate compound (fluorine-containing sulfonate derivative) shown in Table 1 or 2 each in an amount as shown in Table 1 or 2. Electrolytic solutions of examples and comparative examples were each prepared in this manner.

(Production of Laminate Cell)

$LiNi_{1/3}Mn_{1/3}Co_{1/3}O_2$, carbon black, and polyvinylidene fluoride (Kureha Corporation, product name: KF-7200) were mixed at a ratio of 92/3/5 (by mass) to give a positive electrode active material. The positive electrode material was dispersed in N-methyl-2-pyrrolidone to form a slurry. This slurry was used as a positive electrode mixture slurry. The resulting positive electrode mixture slurry was uniformly applied to an aluminum current collector, and then dried to provide a positive electrode mixture layer (thickness: 50 μm). Thereafter, the workpiece was compressed with a roll press device. Thereby, a positive electrode laminate was produced. A piece in a size of 5.0 mm×7.0 mm was punched out from the positive electrode laminate. The obtained piece was used as a positive electrode.

Separately, to artificial graphite powder was added styrene-butadiene rubber dispersed in distilled water in an amount giving a solids content of 4% by mass, and they were mixed using a disperser to form a slurry. The slurry was uniformly applied to a negative electrode current collector (copper foil with a thickness of 10 μm), and then dried to provide a negative electrode mixture layer. Thereafter, the workpiece was compressed with a roll press device. A piece in a size of 5.0 mm×7.0 mm was punched out from the pressed workpiece. The obtained piece was used as a negative electrode.

The positive electrode and the negative electrode were allowed to face each other with a microporous polyethylene film (separator) having a thickness of 20 μm therebetween and assembled in an aluminum laminate film (Dai Nippon Printing Co., Ltd.). The nonaqueous electrolytic solution obtained above was injected to the resulting assembly and was allowed to sufficiently permeate the separator and the like. Then, the assembly was sealed, precharged, and aged. Thereby, an aluminum-laminate lithium ion secondary battery was produced, and subjected to gas volume measurement.

In the gas volume measurement, the battery was charged at 1.0 C and 4.35 V until the charging current reached ⅒ C. The volume of the cell was measured by the Archimedes method, and the cell was stored in a thermostatic bath at 85° C. for a day. The volume of the cell after storage was similarly measured. The change in volume before and after the storage was determined as the gas volume. The gas volume is shown in Tables 1 and 2.

Abbreviations in Tables 1 and 2 refer to the following compounds.
EC: Ethylene carbonate
PC: Propylene carbonate
EMC: Ethyl methyl carbonate
DEC: Diethyl carbonate
VC: Vinylenecarbonate Components shown in Tables 1 and 2 refer to the following compounds.
Component (a): Compound represented by the following formula (12)
Component (b): Compound represented by the following formula (15)

Component (a):

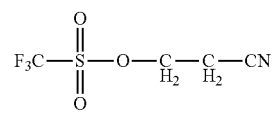

(12)

Component (b):

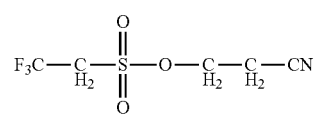

(15)

FEC: Fluoroethylene carbonate

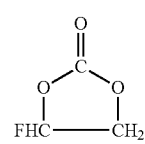

(2)

DFEC: Difluoroethylene carbonate

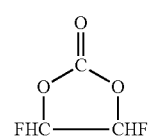

(3)

Trifluoro ethyl ethylene carbonate:

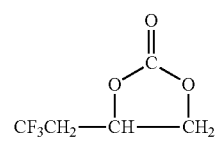

(4)

Trifluoro methyl ethylene carbonate:

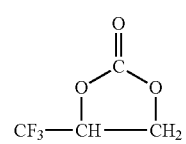

(7)

TABLE 1

|  | Nonaqueous solvent (Vol %) | Nonaqueous electrolyte salt (mol/l) | fluorine-containing sulfonate derivative | Amount (wt %) | Other additives (wt %) | Gas amount (Δ vol; ml) |
|---|---|---|---|---|---|---|
| Example 1 | EC/EMC (30/70) | LiPF6 (1) | Component (a) | 0.01 | VC (2) | 0.83 |
| Example 2 | EC/EMC (30/70) | LiPF6 (1) | Component (a) | 0.1 | VC (2) | 0.74 |
| Example 3 | EC/EMC (30/70) | LiPF6 (1) | Component (a) | 2.0 | VC (2) | 0.70 |
| Example 4 | EC/EMC (30/70) | LiPF6 (1) | Component (a) | 10.0 | VC (2) | 0.82 |
| Example 5 | EC/EMC (30/70) | LiPF6 (1) | Component (a) | 15.0 | VC (2) | 1.22 |
| Example 6 | EC/EMC (30/70) | LiPF6 (1) | Component (b) | 0.1 | — | 0.65 |
| Example 7 | EC/EMC (30/70) | LiPF6 (1) | Component (b) | 2.0 | — | 0.58 |
| Example 8 | EC/EMC (30/70) | LiPF6 (1) | Component (b) | 10.0 | — | 0.76 |
| Example 9 | EC/PC/DEC (30/10/60) | LiPF6 (1) | Component (a) | 2.0 | VC (2) | 1.21 |
| Example 10 | FEC/(2,2,2-trifluoroethyl)methyl carbonate (30/70) | LiPF6 (1) | Component (a) | 2.0 | — | 2.55 |
| Example 11 | FEC/(2,2,2-trifluoroethyl)methyl carbonate (30/70) | LiPF6 (1) | Component (a) | 10.0 | — | 2.61 |
| Example 12 | DFEC/trifluoromethyl ethylene carbonate/(2,2,2-trifluoroethyl)methyl carbonate (2/9/89) | LiPF6 (1) | Component (a) | 2.0 | — | 0.42 |
| Example 13 | FEC/(2,2,3,3-tetrafluoropropyl)methyl carbonate (30/70) | LiPF6 (1) | Component (a) | 2.0 | — | 2.39 |
| Example 14 | Trifluoroethyl ethylene carbonate/FEC/(2,2,2-trifluoroethyl)methyl carbonate (2/9/89) | LiPF6 (1) | Component (a) | 2.0 | VC (2) | 2.12 |
| Example 15 | EC/EMC/FEC (20/70/10) | LiPF6 (1) | Component (a) | 0.1 | VC (2) | 1.31 |
| Example 16 | EC/EMC/FEC (20/70/10) | LiPF6 (1) | Component (a) | 2.0 | VC (2) | 1.19 |
| Example 17 | EC/EMC/FEC (20/70/10) | LiPF6 (1) | Component (a) | 10.0 | VC (2) | 1.22 |
| Example 18 | EC/EMC/DFEC (20/70/10) | LiPF6 (1) | Component (a) | 2.0 | VC (2) | 0.60 |

TABLE 2

|  | Nonaqueous solvent (Vol %) | Nonaqueous electrolyte salt (mol/l) | Fluorine-containing sulfonate derivative | Amount (wt %) | Other additives (wt %) | Gas amount (Δ vol; ml) |
|---|---|---|---|---|---|---|
| Comparative Example 1 | EC/EMC (30/70) | LiPF6 (1) | — | — | VC (2) | 0.82 |
| Comparative Example 2 | FEC/(2,2,2-trifluoroethyl)methyl carbonate (30/70) | LiPF6 (1) | — | — | — | 2.80 |
| Comparative Example 3 | DFEC/trifluoromethyl ethylene carbonate/(2,2,2-trifluoroethyl)methyl carbonate (2/9/89) | LiPF6 (1) | — | — | — | 0.53 |
| Comparative Example 4 | FEC/(2,2,3,3-tetrafluoropropyl)methyl carbonate (30/70) | LiPF6 (1) | — | — | — | 2.69 |
| Comparative Example 5 | Trifluoroethyl ethylene carbonate/FEC/(2,2,2-trifluoroethyl)methyl carbonate (2/9/89) | LiPF6 (1) | — | — | — | 2.29 |
| Comparative Example 6 | EC/EMC/FEC (20/70/10) | LiPF6 (1) | — | — | VC (2) | 1.34 |
| Comparative Example 7 | EC/EMC/DFEC (20/70/10) | LiPF6 (1) | — | — | VC (2) | 0.66 |

INDUSTRIAL APPLICABILITY

The electrolytic solution of the present invention can be suitably used for electrochemical devices such as lithium ion secondary batteries.

The invention claimed is:

1. An electrolytic solution comprising
a nonaqueous solvent (I),
an electrolyte salt (II), and
a compound (III) represented by the following formula (1):

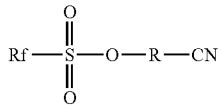
(1)

wherein Rf represents a C1-C20 linear or branched fluorinated alkyl group or a C3-C20 fluorinated alkyl group having a cyclic structure, R represents a C1-C20 linear or branched alkylene group or a C3-C20 alkylene group having a cyclic structure, hydrogen atoms in R may be partially or fully replaced by fluorine atoms, Rf and R may each contain an oxygen atom between carbon atoms when having a carbon number of 2 or more as long as oxygen atoms are not adjacent to each other.

2. The electrolytic solution according to claim 1, wherein Rf is $CF_3$— or $CF_3$—$CH_2$—.

3. The electrolytic solution according to claim 1, wherein R is —$CH_2$—, —$CH_2$—$CH_2$—, or —$CH_2$—$CH_2$—$CH_2$—.

4. The electrolytic solution according to claim 1, wherein the nonaqueous solvent (I) contains a fluorinated cyclic carbonate or a nonfluorinated cyclic carbonate.

5. The electrolytic solution according to claim 1, wherein the nonaqueous solvent (I) contains a fluorinated acyclic carbonate or a nonfluorinated acyclic carbonate.

6. The electrolytic solution according to claim 1, wherein the nonaqueous solvent (I) contains a fluorinated cyclic carbonate.

7. The electrolytic solution according to claim 4, wherein the fluorinated cyclic carbonate is at least one compound selected from the group consisting of compounds represented by the following formulas (2) to (7):

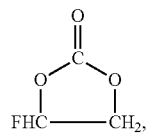
(2)

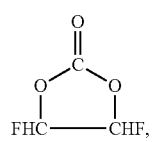
(3)

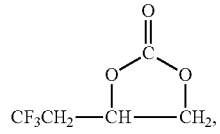
(4)

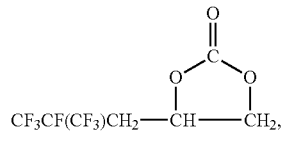
(5)

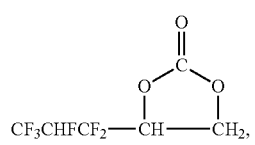
(6)

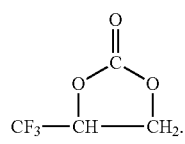
(7)

8. The electrolytic solution according to claim 1, wherein the nonaqueous solvent (I) contains a fluorinated acyclic carbonate.

9. The electrolytic solution according to claim 5, wherein the fluorinated acyclic carbonate is at least one compound selected from the group consisting of (2,2,2-trifluoroethyl)methyl carbonate and (2,2,3,3-tetrafluoropropyl)methyl carbonate.

10. An electrochemical device comprising the electrolytic solution according to claim 1.

11. A lithium ion secondary battery comprising the electrolytic solution according to claim 1.

12. A module comprising the lithium ion secondary battery according to claim 11.

* * * * *